US012784183B2

(12) United States Patent
Suzuki

(10) Patent No.: US 12,784,183 B2
(45) Date of Patent: Nov. 3, 2026

(54) INSPECTION APPARATUS, INSPECTION METHOD, AND NONTRANSITORY RECORDING MEDIUM

(71) Applicant: Satoshi Suzuki, Kanagawa (JP)

(72) Inventor: Satoshi Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 225 days.

(21) Appl. No.: 18/755,776

(22) Filed: Jun. 27, 2024

(65) Prior Publication Data

US 2025/0014172 A1 Jan. 9, 2025

(30) Foreign Application Priority Data

Jul. 3, 2023 (JP) ................................ 2023-109486

(51) Int. Cl.
*G06T 7/00* (2017.01)

(52) U.S. Cl.
CPC .... *G06T 7/001* (2013.01); *G06T 2207/20104* (2013.01); *G06T 2207/30144* (2013.01)

(58) Field of Classification Search
CPC ........... G06T 7/001; G06T 2207/20104; G06T 2207/30144
USPC .......................................................... 382/112
See application file for complete search history.

(56) References Cited

U.S. PATENT DOCUMENTS

2015/0002887 A1* 1/2015 Kato ...................... G06K 15/02 358/1.14
2015/0063889 A1* 3/2015 Kojima .................. G03G 15/36 399/394
2021/0256677 A1* 8/2021 Kobashi ................ G06V 30/40
2022/0300219 A1 9/2022 Kitai
2023/0094188 A1 3/2023 Ohyama

FOREIGN PATENT DOCUMENTS

JP H11-078183 A 3/1999
JP 2015-065647 A 4/2015
JP 2022-145188 A 10/2022
JP 2023-051485 A 4/2023
JP 2024-033823 A 3/2024

* cited by examiner

*Primary Examiner* — Stephen P Coleman
(74) *Attorney, Agent, or Firm* — XSENSUS LLP

(57) ABSTRACT

An inspection apparatus includes a reading device to read a printed medium on which a form is printed in advance to generate first image data, a printed matter being the printed medium on which an image is printed by a printing apparatus based on print data to generate second image data, and circuitry. The circuitry is to generate a difference image between the second image data and a master image, the master image being generated from the print data, generate a mask image on which a portion of the form in the first image data is expanded, execute mask processing on the difference image using the mask image, and determine whether a defect exists on the printed matter based on the difference image on which the mask processing is executed.

12 Claims, 27 Drawing Sheets

FIG. 5

Job Management Information

| Parameter | Remark | Initial Setting |
|---|---|---|
| Job Generation Source | DFE Job, Internal Job | Set by generation source |
| Generation Time | Time when job information is generated by generation source | Set by generation source |
| Page ID | Identification information of printed page, Incremented by 1 for each page processed since the power on | 0 |
| Print Side | Single-sided printing, Front side in double-sided printing, Back side in double-sided printing | Set by generation source |
| Sheet ID | Identification information of sheet, Incremented by 1 for each sheet processed since the power on | 0 |
| Copy ID | Identification information of copy unit, Incremented by 1 for each copy unit completed since the power on | 0 |
| Job ID | Identification information of each job, Incremented by 1 for each job completed since the power on | 0 |
| Sheet Type | Type of Sheet | Set by generation source |
| Sheet Size | Size of Sheet | Set by generation source |
| Job Type | Subjected to defect detection, Not subjected to defect detection | Set by generation source |
| ... | ... | ... |

FIG. 6

| | | |
|---|---|---|
| 1 | 1 | 1 |
| 1 | 1 | 1 |
| 1 | 1 | 1 |

FIG. 7

| Parameter Name | Meaning |
|---|---|
| expant_tl_x | Expansion Processing Range Upper Left x Coordinate |
| expant_tl_y | Expansion Processing Range Upper Left y Coordinate |
| expant_br_x | Expansion Processing Range Lower Right x Coordinate |
| expant_br_y | Expansion Processing Range Lower Right y Coordinate |

FIG. 8 n PIECES

| Parameter Name | Meaning |
|---|---|
| unmask_tl_x | Mask Releasing Range Upper Left x Coordinate |
| unmask_tl_y | Mask Releasing Range Upper Left y Coordinate |
| unmask_br_x | Mask Releasing Range Lower Right x Coordinate |
| unmask_br_y | Mask Releasing Range Lower Right y Coordinate |

INSPECTION APPARATUS, INSPECTION METHOD, AND NONTRANSITORY RECORDING MEDIUM

CROSS-REFERENCE TO RELATED APPLICATION

This patent application is based on and claims priority pursuant to 35 U.S.C. § 119 (a) to Japanese Patent Application No. 2023-109486, filed on Jul. 3, 2023, in the Japan Patent Office, the entire disclosure of which is hereby incorporated by reference herein.

BACKGROUND

Technical Field

The present disclosure relates to an inspection apparatus, an inspection method, and a non-transitory recording medium.

Related Art

A printing apparatus that forms an image on a sheet based on print data and outputs a printed matter is known. Also, an inspection apparatus that reads the printed matter with a reading device to generate an inspection image and compares the print data with the inspection image to inspect the quality of the printed matter is known.

Further, mask processing using, as a printed medium, a pre-printed sheet on which a form such as a slip is already printed is known. It is assumed that the printing apparatus prints an image on the pre-printed sheet based on the print data. The inspection apparatus reads the pre-printed sheet with the reading device in advance to generate a mask image, and masks the inspection image with the mask image to inspect whether the image other than the form is appropriately printed based on the print data.

SUMMARY

In one aspect, an inspection apparatus includes a reading device to read a printed medium on which a form is printed in advance to generate first image data, a printed matter being the printed medium on which an image is printed by a printing apparatus based on print data to generate second image data, and circuitry. The circuitry is to generate a difference image between the second image data and a master image, the master image being generated from the print data, generate a mask image on which a portion of the form in the first image data is expanded, execute mask processing on the difference image using the mask image, and determine whether a defect exists on the printed matter based on the difference image on which the mask processing is executed.

In another aspect, an inspection method includes obtaining first image data generated by reading a printed medium on which a form is printed in advance, obtaining second image data generated by reading a printed matter, the printed matter being the printed medium on which an image is printed by a printing apparatus based on print data, generating a difference image between the second image data and a master image, the master image being generated from the print data, generating a mask image on which a portion of the form in the first image data is expanded, executing mask processing on the difference image using the mask image, and determining whether a defect exists on the printed matter based on the difference image on which the mask processing is executed.

In another aspect, a non-transitory recording medium storing a plurality of program codes which, when executed by one or more processors, causes the processors to perform a method including obtaining first image data generated by reading a printed medium on which a form is printed in advance, obtaining second image data generated by reading a printed matter, the printed matter being the printed medium on which an image is printed by a printing apparatus based on print data, generating a difference image between the second image data and a master image, the master image being generated from the print data, generating a mask image on which a portion of the form in the first image data is expanded, executing mask processing on the difference image using the mask image, and determining whether a defect exists on the printed matter based on the difference image on which the mask processing is executed.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of job management information according to the embodiment of the present disclosure;

FIG. 6 is a diagram illustrating an example of an expansion and contraction filter according to the embodiment of the present disclosure;

FIG. 7 is a diagram illustrating an example of expansion processing range information according to the embodiment of the present disclosure;

FIG. 8 is a diagram illustrating an example of mask releasing range information according to the embodiment of the present disclosure;

Figure 1:
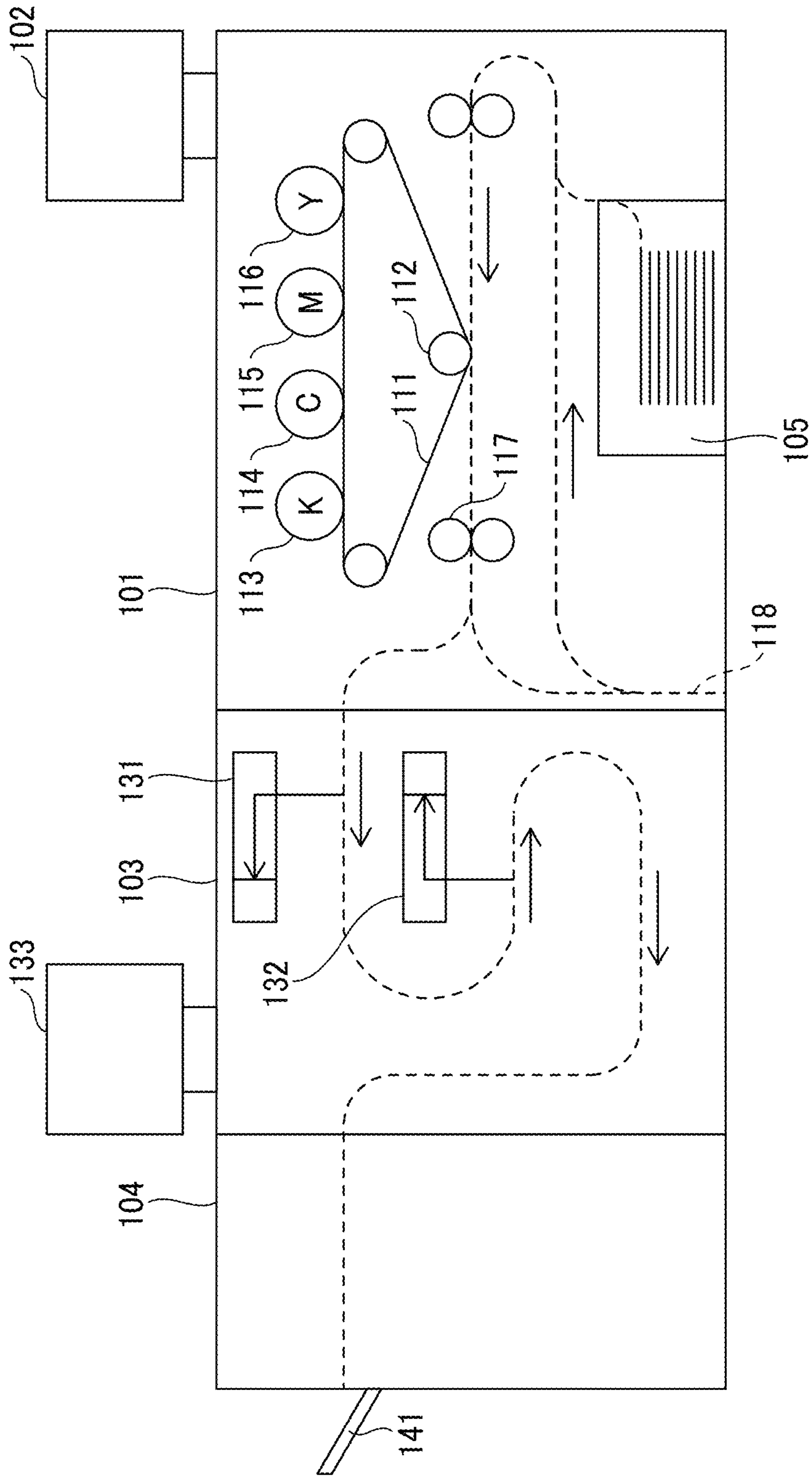
FIG. 1 is a schematic diagram illustrating a configuration of a printing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A printing system and an inspection method performed by the printing system according to embodiments of the present disclosure are described below.

Inspection Flow

Figure 30:
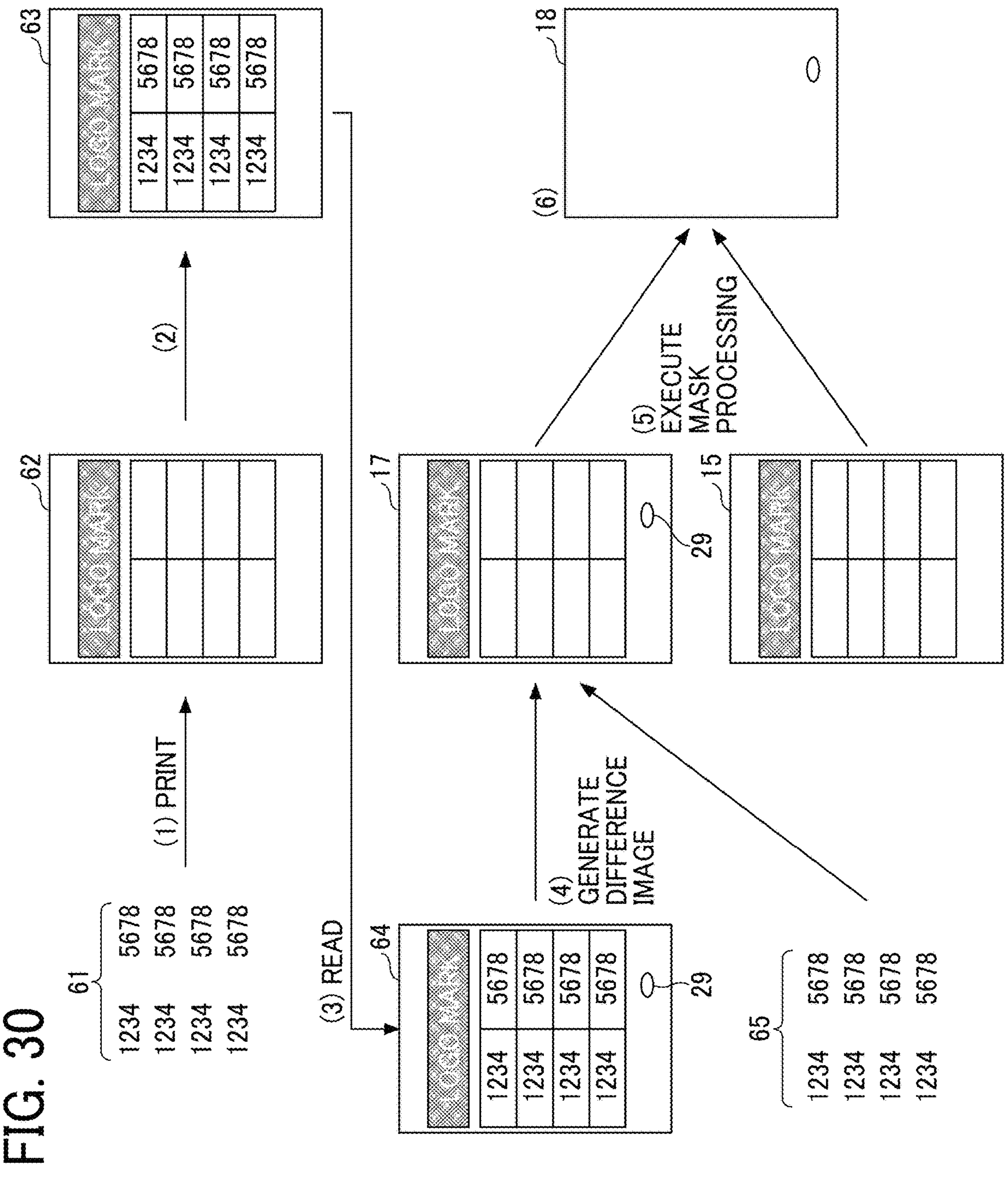
FIG. 30 is a diagram illustrating a flow of printing, generation of an inspection image, generation of a difference image, mask processing, and inspection, according to the embodiment of the present disclosure.

First, with reference to FIG. 30, an overview of inspection of a printed matter is described. FIG. 30 is a diagram illustrating a flow of printing, generation of an inspection image, generation of a difference image, mask processing, and inspection, according to the embodiment of the present disclosure.

(1) A printer prints an image based on print data 61 prepared in advance on a pre-printed sheet 62. The pre-printed sheet 62 is a sheet on which a form such as ruled lines has already been printed.

(2) The printer outputs a printed matter 63 that is the pre-printed sheet 62 on which the image is printed based on the print data 61. An inspection apparatus inspects the quality of the printed matter 63.

(3) For this purpose, the inspection apparatus reads the printed matter 63 with, for example, a scanner and generates an inspection image 64 (an example of second image data).

(4) The inspection apparatus generates a difference image 17 that is a difference between the inspection image 64 and a master image 65 generated from the print data 61. Accordingly, when the print quality is ideal, only the form remains on the difference image 17. In FIG. 30, a stain 29 formed during the printing process is present on the difference image 17. The stain 29 may be formed during printing or reading.

(5) The inspection apparatus masks the difference image 17 using a mask image 15 generated in advance based on a pre-printed image (an example of first image data) obtained by reading the pre-printed sheet 62.

(6) In an ideal case, a masked difference image 18 is a blank image, and in this case, it is determined that no abnormality exists. In FIG. 30, since the stain 29 is determined to exist on the masked difference image 18, an abnormality is detected on the printed matter.

However, due to the misalignment of the form on the pre-printed sheet or the skew of the pre-printed sheet, the positions of the portion of the form in the read inspection image and the portion of the form in the mask image may not exactly match. For this reason, the inspection apparatus cannot completely mask the portion of the form in the inspection image, and may erroneously detect the portion of the form as a defect.

In view of the above, the printing system according to the present embodiment executes a process to expand the portion of the form on the mask image. Examples of the expansion processing include margin setting, and the composition processing to compose flag images, which will be described later. The portion of the form is expanded according to either one of the expansion processing. Thus, even when distortion occurs due to the misalignment of the form on the pre-printed sheet or the skew of the pre-printed sheet, the portion of the form on the inspection image can be masked. As a result, the portion of the form is prevented from being erroneously detected as a defect.

Terminology

The term "expansion processing" is processing to output one pixel having a pixel value of one to the coordinates of the output image corresponding to a pixel of interest when even one pixel having a pixel value of one exists in the pixel of interest and the vicinity of the pixel of interest. The term "contraction processing" is processing to output one pixel having a pixel value of zero to the coordinates of the output image corresponding to a pixel of interest when even one pixel having a pixel value of zero exists in the pixel of interest and the vicinity of the pixel of interest. In other words, the expansion processing is to expand the area of pixels having a pixel value of one, and the contraction processing is to contract the area of pixels having a pixel value of one (expand the area of pixels having a pixel value of zero).

The term "margin" generally refers to an extra or a surplus. In the present embodiment, the margin means that the mask processing is executed more widely than usual.

The term "printed medium" is a print sheet on which a form has already been printed. Examples of the printed medium include a slip on which ruled lines are printed and a postcard on which fields for inputting numbers are printed. In the present embodiment, the printed medium is described using the term "pre-printed sheet."

The term "inspection image" is an image generated by reading a printed matter that is a pre-printed sheet on which an image is printed based on print data, and is an image that is subject to quality control. The portion of the inspection image to be inspected is a portion of the inspection image that is not masked by the mask image (a portion other than the mask image).

The term "mask image" is an image generated by reading a pre-printed sheet. Accordingly, the mask image is an image of the portion of the form that has already been printed. By executing the mask processing on the inspection image using the mask image, the inspection apparatus can inspect the image quality of the printed matter resulting from the print data without the influence from the portion of the form. The term "mask processing" is image processing for excluding a portion not used from image data. The portion not used is designated by the mask image.

The term "master image" is an image obtained by executing red, green, and blue (RGB) color conversion on an image on which raster image processing (RIP) is executed based on print data. In the present embodiment, the master image is used when the mask image is generated and when the difference image is generated using the inspection image. However, the image on which the RIP is executed (referred to as a RIP image in the following description) is not necessarily required when the mask image is generated.

The term "detection mode during actual printing" is a mode in which a printed matter is actually printed and the quality of the printed matter (an entirety or a part of the printed matter) is inspected. The term "pre-printed mask generation mode" is a mode in which the mask image is generated.

Configuration of Printing System

FIG. 1 is a schematic diagram illustrating a configuration of a printing system 100 according to an embodiment of the present disclosure. The configuration of the printing system 100 illustrated in FIG. 1 is given by way of example, and any configuration that can detect a defect described in the present embodiment may be used.

The printing system 100 includes a printer 101, an inspection apparatus 103, and a stacker 104. All or two of the printer 101, the inspection apparatus 103, and the stacker 104 may be integrated into one apparatus. The printer 101 is an apparatus that receives data representing, for example, characters, images, or graphics, and prints an image on, for example, a sheet based on the data. The printer 101 may also be referred to as a printing apparatus or a multifunction peripheral/printer/product (MFP).

An operation panel 102 of the printer 101 is disposed on the top face of the printer 101. The operation panel 102 includes a display (touch panel) and a keyboard, and displays an operation screen. The operation panel 102 displays an operation screen for operating the printing system 100 and receives various kinds of operations from an operator.

The printer 101 receives a print job that includes a RIP image from an external device such as a digital front end (DFE) to be described later or a personal computer (PC), or receives an instruction to execute a print job stored in the printer 101. In the present embodiment, the RIP image is assumed to be formed in 8 bits for each of cyan, magenta, yellow, and black (CMYK) colors, as an image with 600 dot per inch (dpi).

The printer 101, in accordance with the contents of a print job instructed to be executed, acquires a sheet from a sheet feeder 105 and conveys the sheet along a path indicated by a dotted line in FIG. 1. The printer 101 forms an image on the sheet using drums 113, 114, 115, and 116. The toner images of black (K), cyan (C), magenta (M), and yellow (Y) respectively formed on the drums 113, 114, 115, and 116 are superimposed on a belt 111 to form a full-color toner image. Then, the full-color toner image is transferred onto the sheet conveyed to a roller 112 and fixed onto the sheet by a roller pair 117 using heat and pressure. In the case of single-sided printing, the sheet is ejected to the inspection apparatus 103 without any other process. In the case of double-sided printing, the sheet is reversed in a reverse path 118 and conveyed to the roller 112. Then, another full-color toner image formed by the drums 113, 114, 115, and 116 is also transferred and fixed onto the back side of the sheet and the sheet is ejected to the inspection apparatus 103.

The inspection apparatus 103 is an apparatus for inspecting the print quality of the printed matter output by the printer 101. The inspection apparatus 103 includes an operation panel 133 of the inspection apparatus 103. The functions of the operation panel 133 may be the same as those of the operation panel 102. The inspection apparatus 103 may not include the operation panel 133, and the operation panel 102 of the printer main body may also serve as the operation panel 133. Alternatively, the operation panel 133 of the inspection apparatus 103 may be a PC connected via, for example, a local area network (LAN). In this case, the PC displays the inspection result using, for example, a web browser or a dedicated application.

The inspection apparatus 103 separately reads an image on each face of the sheet ejected from the printer 101 using reading devices 131 and 132, conveys the sheet along with the path in a direction indicated by arrows, and ejects the sheet to the stacker 104. Each of the reading devices 131 and 132 is an example of reading means, which may be implemented by a sensor. In the present embodiment, the image read by each of the reading devices 131 and 132 is assumed to be formed in 8 bits for each of RGB colors as an image with 200 dpi.

The stacker 104 stacks the sheet ejected from the inspection apparatus 103 on a tray 141.

Digital Front End (DFE)

Figure 2:
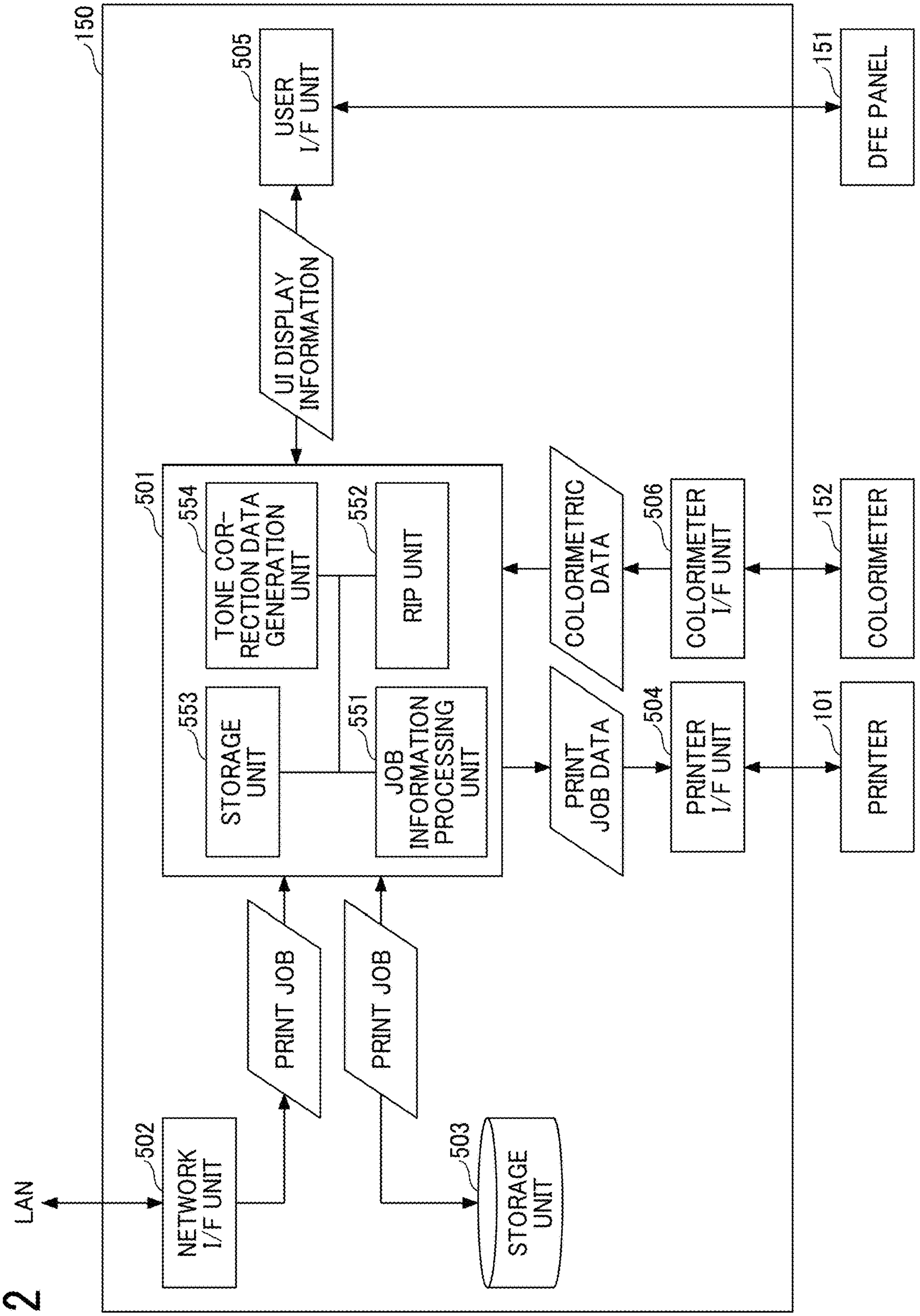
FIG. 2 is a block diagram illustrating a configuration of a digital front end (DFE) according to the embodiment of the present disclosure.

Referring to FIG. 2, a digital front end (DFE) 150 is described below. The digital front end (DFE) is a general term representing devices that process data to be input to a printer. The DFE 150 generates RIP data to be printed by the printer 101 from print data such as POSTSCRIPT data.

FIG. 2 is a block diagram illustrating a configuration of the DFE 150 according to the embodiment of the present disclosure. The printer 101 in FIG. 1 and a DFE panel 151 for displaying a user interface are connected to the DFE 150. The DFE panel 151 is a user interface that includes a display (touch panel) and a keyboard.

The DFE 150 includes a system control unit 501, a network interface (I/F) unit 502, a user I/F unit 505, a storage unit 503, a printer I/F unit 504, and a colorimeter I/F unit 506. The DFE 150 includes a computer for performing control and processing. In one example, these units of the DFE 150 provide functions implemented by circuitry such as a central processing unit (CPU) of the computer executing instructions included in one or more programs installed in the computer.

The user I/F unit 505 of the DFE 150, which is implemented by an interface circuit, generates a screen to be displayed on the DFE panel 151 using user interface (UI) display information, and causes the DFE panel 151 to display the screen. The UI display information includes a plurality of display components that form the screen and the arrangement thereof.

The network I/F unit 502 of the DFE 150, which is implemented by an interface circuit, is a communication interface for communication to connect the DFE 150 to the LAN. The network I/F unit 502 receives a print job through the LAN and transmits the print job to the system control unit 501.

Alternatively, the print job may be stored in the storage unit 503 that is implemented by any desired memory, and the system control unit 501 acquires the print job from the storage unit 503. In other words, the system control unit 501 may receive the print job via the network I/F unit 502 or may acquire the print job from the storage unit 503.

The DFE 150 includes the system control unit 501. The system control unit 501 controls the entire operation of the DFE 150. The system control unit 501 includes a job information processing unit 551, a RIP unit 552, a storage unit 553, and a tone correction data generation unit 554.

The job information processing unit 551 manages, as job management information relating to the print job, the status of the print job, the input of the print job to the printer 101, and the progress of the print job (obtained from the printer 101) in the storage unit 553, for example. The job information processing unit 551 inputs print job data to the printer 101 together with the job management information and the data of the RIP image. In the storage unit 553, the print job data relating to the print job (e.g., a job identification (ID), a file name, a job registration date and time, a job owner) is stored.

The tone correction data generation unit 554 adjusts the print data so that the print data is printed with the same tone, density, and color as those of the original document. For example, the tone correction data generation unit 554 strengthens or weakens the tone, increases or decreases the density, or increases or reduces warm colors or blue colors.

The RIP unit 552 generates RIP data to be printed by the printer 101 from print data such as POSTSCRIPT data. The RIP data is dot data (whether dots are formed or not) of the toner of each color.

The printer I/F unit 504 of the DFE 150, which may be implemented by an interface circuit, is an interface for communicating with the printer 101. The printer I/F unit 504 transmits the print job data determined to be input by the system control unit 501 to the printer 101.

The colorimeter I/F unit 506 of the DFE 150, which may be implemented by an interface circuit, is an interface for communicating with a colorimeter 152. The colorimeter I/F unit 506 transmits, to the printer 101, colorimetric data generated by the colorimeter 152 measuring a color chart. The colorimeter 152 is a measuring device for quantitatively measuring color.

Printer

Figure 3:
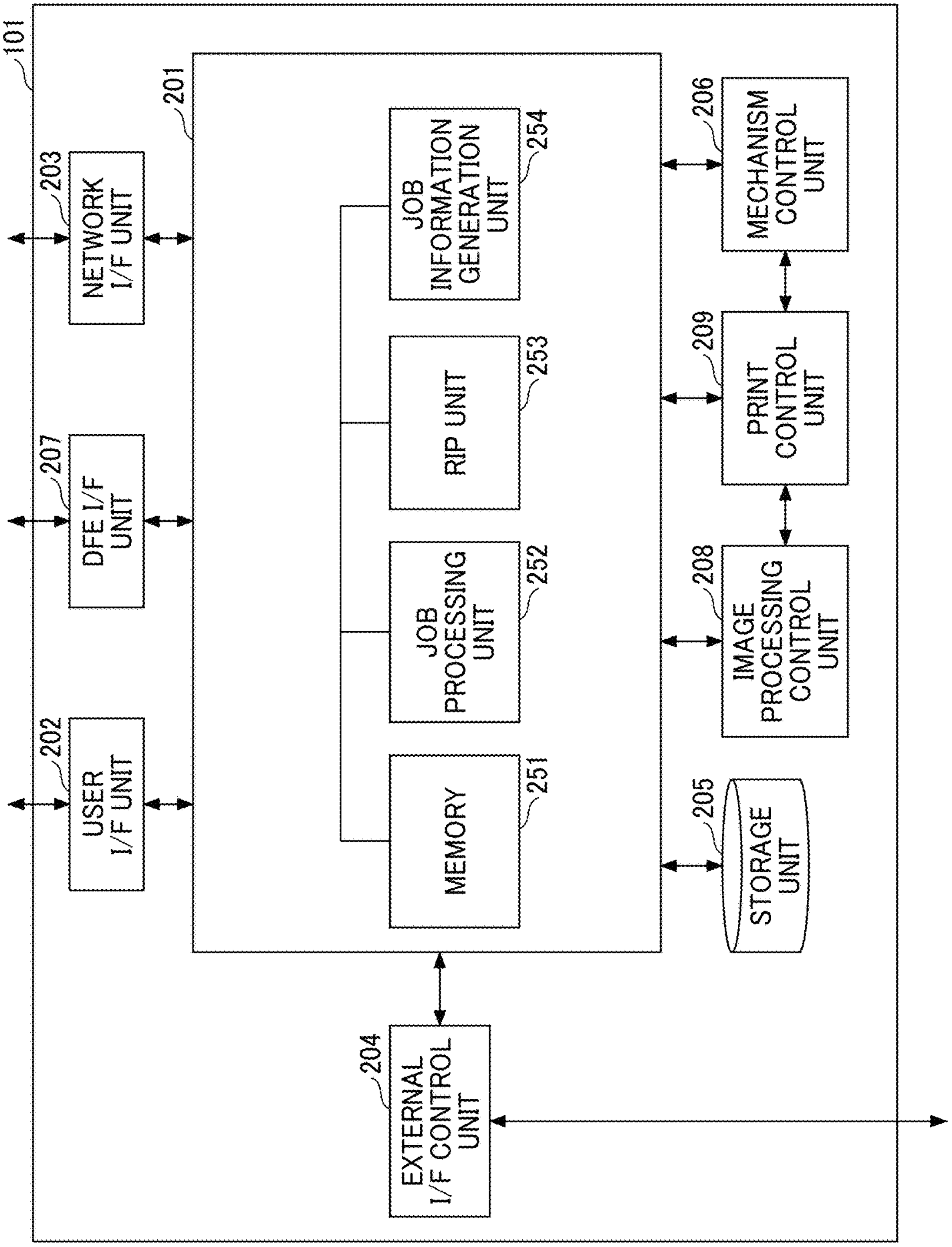
FIG. 3 is a block diagram illustrating a configuration of a printer according to the embodiment of the present disclosure.

FIG. 3 is a block diagram illustrating a configuration of the printer 101 according to the embodiment of the present disclosure. The printer 101 includes a system control unit 201, a user I/F unit 202, a DFE I/F unit 207, a network I/F unit 203, an external I/F control unit 204, a storage unit 205, an image processing control unit 208, a print control unit 209, and a mechanism control unit 206. The printer 101 includes a computer for performing control and processing. In one example, these units of the printer 101 provide functions implemented by circuitry such as a CPU of the computer executing instructions included in one or more programs installed in the computer.

The system control unit 201 controls the entire operation of the printer 101. To the system control unit 201, the user I/F unit 202, the DFE I/F unit 207, the network I/F unit 203, the external I/F control unit 204, the storage unit 205, the image processing control unit 208, the print control unit 209, and the mechanism control unit 206 are connected.

The user I/F unit 202, which may be implemented by an interface circuit, is an interface for connecting the system control unit 201 and the operation panel 102 illustrated in FIG. 1.

The DFE I/F unit 207, which may be implemented by an interface circuit, is an interface for enabling communication (for example, reception of print job data) between the system control unit 201 and the DFE 150 illustrated in FIG. 2.

The network I/F unit 203, which may be implemented by an interface circuit, is an interface for connecting the system control unit 201 to a network such as the LAN and allowing the printer 101 to communicate with devices on the network.

The external I/F control unit 204, which may be implemented by an interface circuit, is an interface through which the printer 101 communicates with other devices (such as the inspection apparatus 103 and the stacker 104).

The storage unit 205 is a storage device implemented by, for example, a hard disk drive (HDD) or a solid state drive (SSD). In the storage unit 205, for example, the print job data is stored.

The mechanism control unit 206 controls the operation of each mechanism in the printer 101, such as sheet conveyance, an image transfer process, and control of double-sided or single-sided printing within the printer 101.

The print control unit 209 instructs the mechanism control unit 206 to control the timing of each mechanism, and also controls the entire operation of image formation on the sheet. The image processing control unit 208 processes the image transferred by the mechanism control unit 206.

The system control unit 201 includes a memory 251, a job processing unit 252, a RIP unit 253, and a job information generation unit 254. The memory 251 is a memory used as a work area for the system control unit 201. In response to receiving the print job data from the DFE 150, the job information generation unit 254 generates, for example, a job ID used in the printer, a reception date and time, and progress, and stores the generated information in the storage unit 205. The RIP unit 253 executes the raster image processing on the print data in the case where the raster image processing has not been executed on the print job. The job processing unit 252 inquires of the print control unit 209 about the availability for print jobs, and determines a print job to be executed from among the print job data stored in the storage unit 205, for example, according to the priority.

Inspection Apparatus

Figure 4:
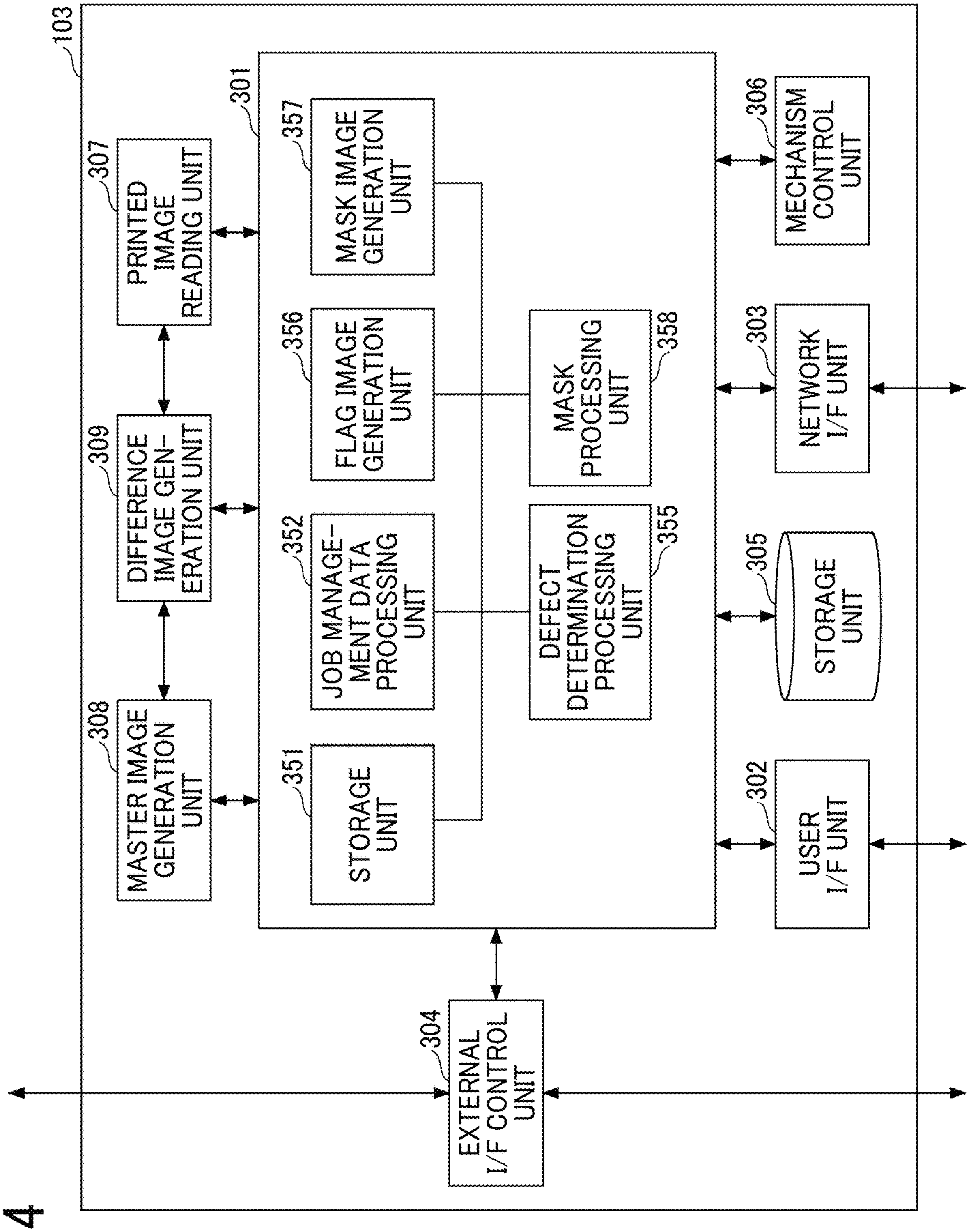
FIG. 4 is a block diagram illustrating a configuration of an inspection apparatus according to the embodiment of the present disclosure.

FIG. 4 is a block diagram illustrating a configuration of the inspection apparatus 103 according to the embodiment of the present disclosure. The inspection apparatus 103 includes a system control unit 301, a master image generation unit 308, a difference image generation unit 309, a printed image reading unit 307, an external I/F control unit 304, a user I/F unit 302, a storage unit 305, a network I/F unit 303, and a mechanism control unit 306. The inspection apparatus includes a computer for performing control and processing. In one example, these units of the inspection apparatus 103 provide functions implemented by circuitry such as a CPU of the computer executing instructions included in one or more programs installed in the computer.

The system control unit 301 controls the entire operation of the inspection apparatus 103. To the system control unit 301, the master image generation unit 308, the difference image generation unit 309, the printed image reading unit 307, the external I/F control unit 304, the user I/F unit 302, the storage unit 305, the network I/F unit 303, and the mechanism control unit 306 are connected.

The user I/F unit 302, which may be implemented by an interface circuit, is an interface for connecting the system control unit 301 and the operation panel 133 illustrated in FIG. 1. The user I/F unit 302 causes the operation panel 133 to display the information of the system control unit 301.

The network I/F unit 303, which may be implemented by an interface circuit, is an interface for connecting the system control unit 301 to a network such as the LAN.

The external I/F control unit 304, which may be implemented by an interface circuit, is an interface for connection with other devices (for example, the printer 101 and the stacker 104).

The mechanism control unit 306 controls the operation of each mechanism of the inspection apparatus 103, such as sheet conveyance, reading of both sides or one side of a sheet, and ejection of a sheet.

The storage unit 305 is a storage device implemented by, for example, an HDD or an SSD. In the storage unit 305, for example, an inspection image, a flag image, a mask intermediate image, a mask image, a master image, and an inspection result are stored.

The printed image reading unit 307 reads both sides of the sheet conveyed from the printer 101 with the reading devices 131 and 132, and outputs an inspection image. The printed image reading unit 307 generates an inspection image in the detection mode during actual printing, which will be described later, and generates a pre-printed image in the pre-printed mask generation mode. The detection mode during actual printing is a mode in which a printed matter is inspected during the execution of a print job. The pre-printed mask generation mode is a mode in which a mask image is generated from a pre-printed sheet before the execution of a print job starts.

In the detection mode during actual printing, the master image generation unit 308 changes the color space for the RIP image transmitted by the DFE 150 (converts CMYK colors into RGB colors). This RIP image is generated from the print data to be formed on the sheet.

The master image generation unit 308 generates a master image whose entire face is white in the pre-printed mask generation mode. Accordingly, in the pre-printed mask generation mode, the RIP image may not be required. Note that the white in the entire face of the master image refers to the white color of the sheet when the master image is printed on the sheet. The same is applied in the following description.

The difference image generation unit 309 generates a difference image in both the detection mode during actual printing and the pre-printed mask generation mode. The difference image is generated by comparing the master image (print data) with the inspection image or by comparing the master image (blank sheet) with the pre-printed image. The difference image is an image that represents the difference in pixel value for each pixel between two images. In the detection mode during actual printing, since the RIP image is generated from the print data to be formed on the sheet and the inspection image is generated by reading the printed matter, the pixel value of the difference image is smaller than a threshold value under normal conditions.

The system control unit 301 includes a storage unit 351, a job management data processing unit 352, a flag image generation unit 356, a mask image generation unit 357, a mask processing unit 358, and a defect determination processing unit 355. The flag image generation unit 356 and the mask image generation unit 357 function in the pre-printed mask generation mode.

The flag image generation unit 356 executes threshold processing for binarization on the difference image to generate a "flag image." The threshold value is stored in, for example, the storage unit 305, and is read out to the storage unit 351 when the process is executed.

The mask image generation unit 357 applies an expansion and contraction filter (see FIG. 6) to the entirety or a designated range (designated area) of the flag image. The image to which the expansion and contraction filter has been applied is referred to as a mask intermediate image. The mask intermediate image is intermediate data between the flag image and the mask image described below. The mask intermediate image is stored in, for example, the storage unit 351. The expansion and contraction filter is stored in, for example, the storage unit 305, and is read out to the storage unit 351 when the processing using the expansion and contraction filter is executed.

The mask image generation unit 357 can also generate a mask intermediate image by executing OR composition to compose a plurality of flag images. The expansion and contraction filter may be applied to the mask intermediate image generated by the OR composition.

The designated range to which the expansion and contraction filter is applied is defined in the expansion processing range information (see FIG. 7). The expansion processing range information is stored in, for example, the storage unit 305, and is read out to the storage unit 351 when the expansion processing is executed. In the case where no expansion processing range information is present (the entire face is targeted in the initial state), the mask image generation unit 357 applies the expansion and contraction filter to the entirety of the flag image.

The mask image generation unit 357 refers to, for example, the mask releasing range information (see FIG. 8) stored in the storage unit 351, and releases masking for the designated range on the mask intermediate image. The mask intermediate image on which this process is executed is referred to as a mask image. The mask image generation unit 357 does not process the mask intermediate image in the case where no mask releasing range information is present. The mask image is stored in the storage unit 305.

The functions relating to a print job is described below. Since the functions are relating to a print job, these functions are used in the detection mode during actual printing.

In the detection mode during actual printing, the system control unit 301 receives print management information (included in the job management information) via the external I/F control unit 304, and stores the print management information in the storage unit 351 of the system control unit 301. The job management data processing unit 352 extracts post-processing device information from the job management information illustrated in FIG. 5 and transmits, via the external I/F control unit 304, the post-processing device information to the stacker 104 that is a post-processing device operating at a stage subsequent to the operation of the inspection apparatus 103. The job management data processing unit 352 reads out the print management information from the storage unit 351. The job management data processing unit 352 transfers the print management information to the master image generation unit 308, the difference image generation unit 309, the printed image reading unit 307, and the mechanism control unit 306 in order for the master image generation unit 308, the difference image generation unit 309, the printed image reading unit 307, and the mechanism control unit 306 to process the print job. The print management information to be transferred is the job management information illustrated in FIG. 5 from which the post-processing device information is removed.

The system control unit 301 executes the following processes in the detection mode during actual printing.

1) The system control unit 301 causes the printed image reading unit 307 to read a printed matter (generation of an inspection image).

2) The system control unit 301 causes the difference image generation unit 309 to generate a difference image between the inspection image and the master image generated from the print data (RIP data).

3) The mask processing unit 358 of the system control unit 301 executes the mask processing on the difference image using the mask image.

4) The defect determination processing unit 355 of the system control unit 301 executes the defect determination processing based on a threshold value for defect determination set in advance.

The defect determination processing unit 355 determines whether an edge having an intensity higher than, for example, the threshold value for defect determination is detected in the difference image on which the mask processing is executed. In the case where an edge having an intensity higher than the threshold value for defect determination is detected, the defect determination processing unit 355 determines that an abnormality exists. In the case where an edge having an intensity higher than the threshold value for defect determination is not detected, the defect determination processing unit 355 determines that an abnormality does not exist. The edge to be detected may be of any shape, such as a point or a line.

Job Management Information

FIG. 5 is a diagram illustrating an example of the job management information according to the embodiment of the present disclosure. This job management information is used for the case where the printer 101 executes an ordinary printing process (in the detection mode during actual printing). In the printing process, print data is generated for each page by at least one of the DFE 150 and the printer 101. The print job is processed based on the job management information.

The job management information includes, as data items, a parameter, a remark, and an initial setting. The parameter is a name of an item. The remark is an explanation of the parameter. The initial setting indicates a setting when the system control unit 201 of the printer 101 receives the parameter.

A job generation source is information indicating a source that outputs a job. In the job generation source, information indicating whether the job is a print job input from the DFE 150 or internal data of the printer 101 is included.

A generation time is information indicating the date and time when the job generation source has generated the job.

A page ID is an identification number of a printed page. The page ID is incremented by one for each page processed since the time the power supply is turned on. A numerical value is set to the page ID when printing is executed.

A print side identifies whether the print job is single-sided printing or double-sided printing. In the case where the print job is identified to be double-sided printing, the print side identifies whether a side on which an image is to be printed is the front side (double-sided front) or the back side (double-sided back) of the sheet.

A sheet ID is identification information of a sheet used for printing. In the case of double-sided printing, the page IDs of pages printed on the same sheet have the same sheet ID. The sheet ID is incremented by one for each sheet processed since the time the power supply is turned on. A numerical value is set to the sheet ID when printing is executed. A copy ID is identification information for each copy unit. The copy ID is incremented by one for each time the output of a copy unit is completed since the power supply is turned on. A numerical value is set to the copy ID when printing is executed.

A job ID is identification information for each job. The job ID is incremented by one for each time the output of a job is completed since the power supply is turned on. A numeric value is set to the job ID when printing is executed.

A sheet type is information on a type of a sheet used for printing. A sheet size is information on a size of the sheet. A job type indicates whether the print job is a print job subject to defect detection or a print job not subject to defect detection, or whether the print job involves an insertion sheet used for identifying defect detection.

Expansion and Contraction Filter

The expansion and contraction processing using the expansion and contraction filter is processing to perform a calculation for a binarized black-and-white image using an expansion and contraction filter of 3×3 pixels and determine a pixel in the center from pixel values of a pixel of interest (in the center) and pixels around (at upper, lower, left, and right) the pixel of interest.

FIG. 6 is a diagram illustrating an example of the expansion and contraction filter according to the embodiment of the present disclosure. The expansion and contraction filter is used for image processing to expand the flag image. The expansion and contraction filter includes a filter size of 3×3, which is required to expand one pixel. To expand the flag image by N pixels, the mask image generation unit 357 executes the image processing N times using the expansion and contraction filter.

In the case of the expansion processing, the expansion and contraction processing using the expansion and contraction filter is processing to output one pixel having a pixel value of one to the coordinates of the output image corresponding to a pixel of interest when even one pixel having a pixel value of one exists in the pixel of interest and the vicinity of the pixel of interest. In the case of the contraction processing, the expansion and contraction processing using the expansion and contraction filter is processing to output one pixel having a pixel value of zero to the coordinates of the output image corresponding to a pixel of interest when even one pixel having a pixel value of zero exists in the pixel of interest and the vicinity of the pixel of interest.

Expansion Processing Range Information

FIG. 7 is a diagram illustrating an example of the expansion processing range information according to the embodiment of the present disclosure. The expansion processing range information defines a range for which the mask image generation unit 357 executes the expansion and contraction processing using the expansion and contraction filter. The expansion processing range information includes the x and y coordinates of the upper left vertex and the x and y coordinates of the lower right vertex of the range for which the expansion and contraction processing using the expansion and contraction filter is executed. Multiple ranges may be designated on a single page. In addition, in consideration of a case where different ranges are designated on the front side and the back side of the printed matter, two types of expansion processing range information, one for the front side and the other for the back side, may be defined. Since the operator can instruct the contraction processing to be executed for the expansion processing range, the expansion processing range may be referred to as a contraction processing range.

The operator can set the expansion processing range information as described later. In the initial state before the operator sets the expansion processing range information, the expansion processing range information indicates the entire range of one page.

Mask Releasing Range Information

FIG. 8 is a diagram illustrating an example of the mask releasing range information according to the embodiment of the present disclosure. The mask releasing range information defines a range for which the mask processing unit 358 releases the mask information (does not mask). The mask releasing range information includes the x and y coordinates of the upper left vertex and the x and y coordinates of the lower right vertex of the range for which the mask information is released. As will be described later, the mask releasing range information is information for preventing the mask processing unit 358 from masking the difference image because of a stain when a stain exists on the mask image on which only the portion of the form should be present.

In consideration of a case where the positions of stains on the front side and the back side of the printed matter are different, two types of mask releasing range information, one for the front side and the other for the back side, may be defined.

Example of Generation of Mask Image

Figure 9:
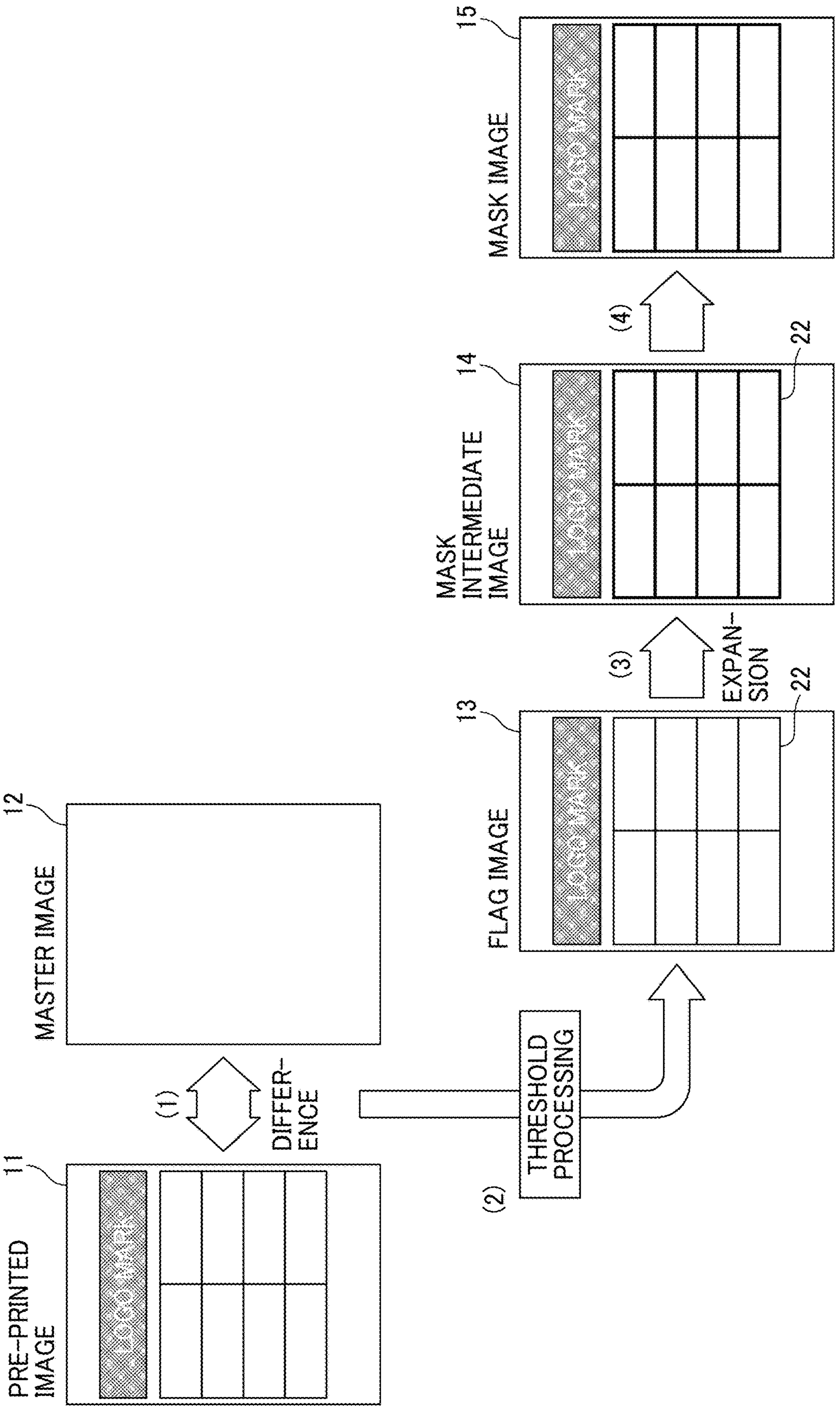
FIG. 9 is a diagram illustrating a method for generating a mask image in a pre-printed mask generation mode, according to the embodiment of the present disclosure.

Next, a method for generating a mask image 15 is described with reference to FIG. 9. FIG. 9 is a diagram illustrating a method for generating the mask image 15 in a pre-printed mask generation mode, according to the embodiment of the present disclosure. The image data generated by the printed image reading unit 307 reading the pre-printed sheet is referred to as a pre-printed image 11. The image whose entire face is white, generated by the master image generation unit 308 is referred to as a master image 12.

(1) The difference image generation unit 309 generates a difference image between the pre-printed image 11 and the master image 12. Since the master image 12 represents a blank sheet, the pre-printed image 11 may be used as a difference image without using the master image. However, by generating the difference image using the master image 12 in this manner, the inspection apparatus 103 can execute the same processing in the detection mode during actual printing and the pre-printed mask generation mode.

(2) The flag image generation unit 356 binarizes the difference image to generate a flag image 13. In the flag image 13, pixels that are flagged (pixels having a pixel value of one) correspond to the portion of the form.

(3) The mask image generation unit 357 executes the expansion processing on the flag image 13 to generate a mask intermediate image 14. As a result of the expansion processing, ruled lines 22 are thickened in the mask intermediate image 14. The portions thickened beyond the ruled lines 22 in the pre-printed image 11 or the flag image 13 are "margins." Any one of the margins is referred to as a "margin" in the following description. In this way, the ruled lines 22 are thickened. Thus, even when the ruled lines in the inspection image are misaligned or skewed, the mask processing is easily executed on the mask image. In addition, even when the ruled lines 22 are broken in the mask intermediate image 14, the ruled lines 22 that are broken can be connected by the expansion processing.

(4) The mask image generation unit 357 generates the mask image 15 by releasing masking for the designated range on the mask intermediate image 14 with reference to the mask releasing range information (see FIG. 8). By releasing masking, one or more pixels having a pixel value of one are replaced with pixels having a pixel value of zero in the mask intermediate image 14 (see FIG. 11).

In FIG. 9, the inspection apparatus 103 expands the portions where the pixels having a pixel value of one are already present. Alternatively or additionally, the operator may set a mask range at a position as desired. For example, it is assumed that a header or footer (date or page number) is printed although the header or footer is not present in the pre-printed image of the present embodiment. In this case, when the header or footer is not to be inspected, the operator may set a mask range for the header or footer.

Example of Automatically Setting Margin

Figure 10:
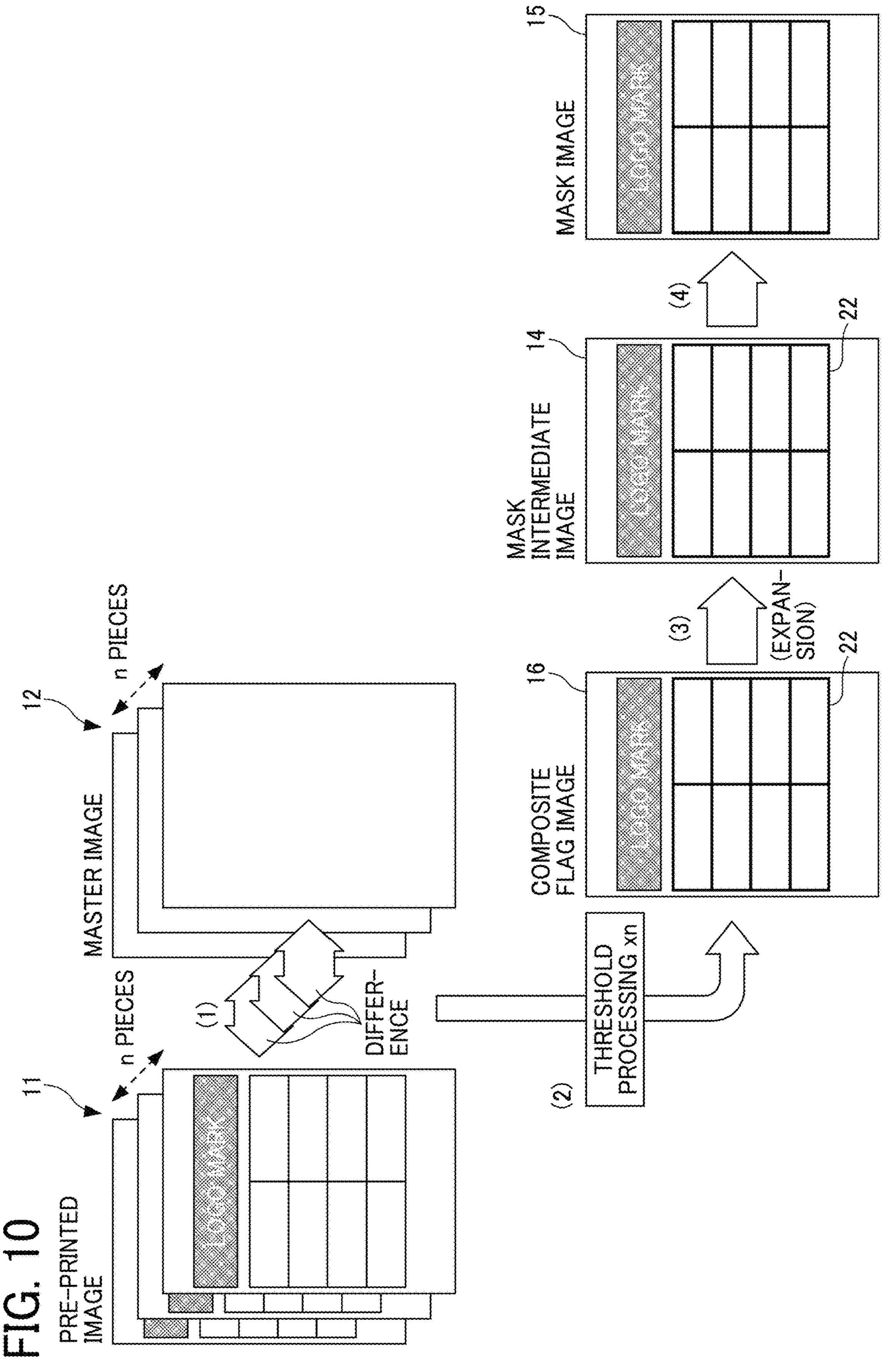
FIG. 10 is a diagram illustrating a method for automatically generating a margin using a difference image, according to the embodiment of the present disclosure.

Next, a method for automatically setting a margin is described with reference to FIG. 10. In other words, in the present embodiment, a margin is set even when the mask image generation unit 357 does not execute the expansion and contraction processing using the expansion and contraction filter. FIG. 10 is a diagram illustrating a method for automatically generating a margin using a difference image, according to the embodiment of the present disclosure.

(1) The difference image generation unit 309 generates n difference images between n pre-printed images 11 and n master images 12.

(2) The flag image generation unit 356 binarizes the n difference images to generate n flag images 13. The mask image generation unit 357 executes OR composition to compose the n flag images 13 in the order of generation. The OR composition means that the pixels having a pixel value of one in the n flag images 13 are arranged in a single image. Since the portion of the form slightly shifts in each read image due to, for example, the misalignment of the portion of the form on the pre-printed sheet or the skew of the pre-printed sheet, a composite flag image 16 generated by the OR composition can be used as the mask intermediate image 14 having margins. As illustrated in FIG. 10, the ruled lines 22 on the composite flag image 16 generated by the OR composition are thicker than those on a single pre-printed image 11.

(3) The mask image generation unit 357 may further execute the expansion processing of the number of pixels specified by the operator on the composite flag image 16. In the case where the deviation among the read images is large, gaps of the ruled lines among the read images may exist on the composite flag image 16. By the expansion processing, the gaps can be filled.

(4) The mask image generation unit 357 generates the mask image 15 by releasing masking for the designated range on the mask intermediate image 14 with reference to the mask releasing range information (see FIG. 8).

Example of Stain Handling on Pre-Printed Sheet

Next, a method for removing a stain on the pre-printed sheet from the mask range is described with reference to FIG. 11. Like reference signs are given to elements operate similarly and provide the same or similar effects, and redundant descriptions may be omitted or only the differences may be described in the following description.

Figure 11:
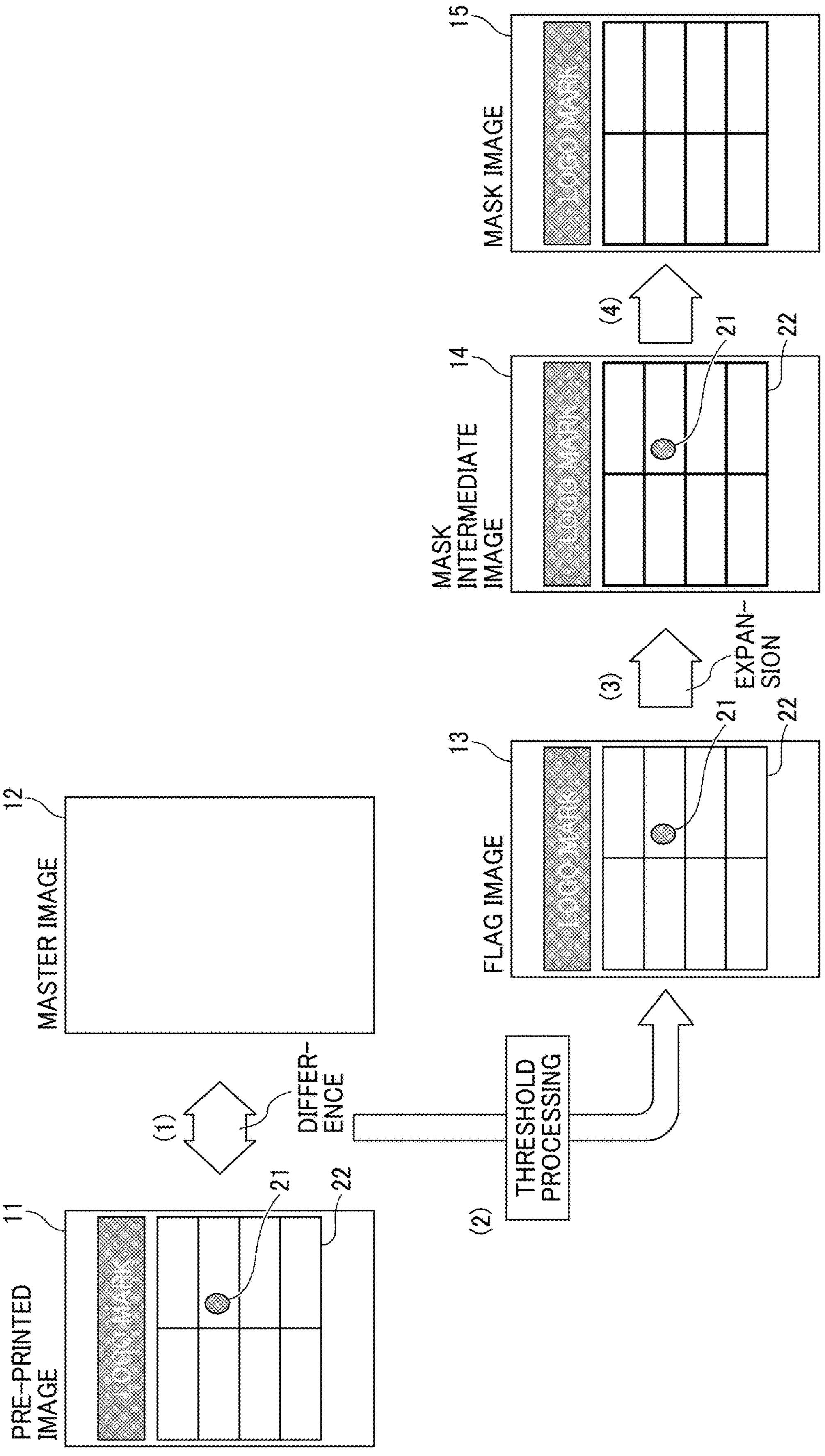
FIG. 11 is a diagram illustrating a method for removing a stain on a pre-printed sheet from a mask range, according to the embodiment of the present disclosure.

As illustrated in FIG. 11, in the case where a stain 21 exists on the pre-printed sheet, the stain 21 is reflected on the pre-printed image 11 and the flag image 13 that are generated by reading the pre-printed sheet. In the case where the stain 21 exists at a position to be inspected initially, the position may be masked. In this case, the inspection image may not be taken out because of the mask processing. In view of the above, the mask image generation unit 357 sets a range for which the mask processing is not executed in the mask releasing range information based on the coordinates of the stain 21 specified by the operator. In the example of FIG. 11, the coordinates of the stain 21 are set in the mask releasing range information.

Accordingly, as illustrated in FIG. 11, although the stain 21 remains in the mask intermediate image 14, the stain 21 is removed in the mask image 15.

Adding Margin Only to Designated Range

Figure 12:
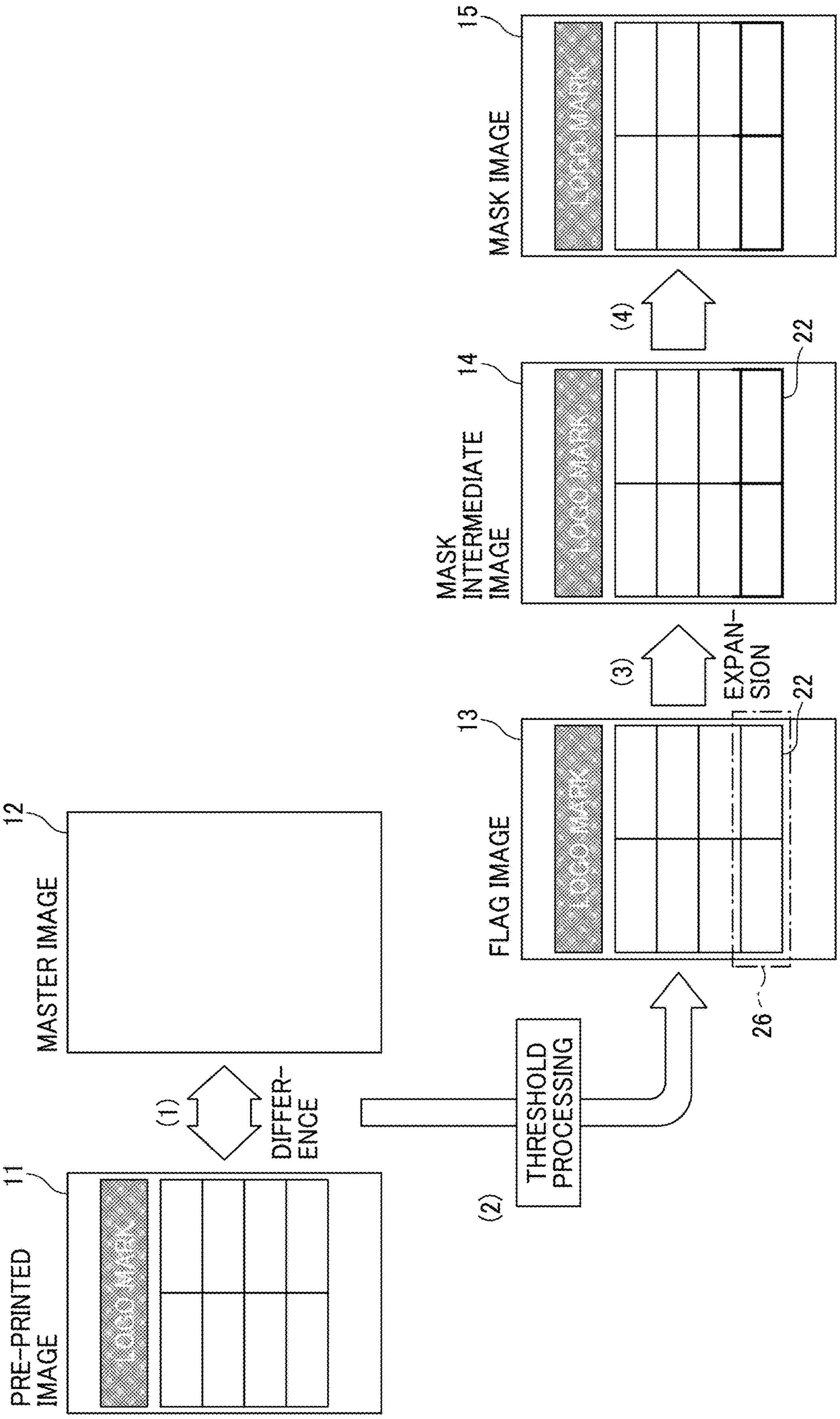
FIG. 12 is a diagram illustrating a method for adding a margin only to a designated range, according to the embodiment of the present disclosure.

FIG. 12 is a diagram illustrating a method for adding a margin only to a designated range, according to the embodiment of the present disclosure. For example, since the deviation due to skew tends to be large in the sub-scanning direction (mainly in the downstream), the operator may desire to increase the margin only for the portion where the deviation is large. On the other hand, in the case where spaces between characters are narrow in a part of the pre-printed sheet, the operator may desire not to increase the margin for the part. In such a case, as will be described later, the operator designates an expansion processing range 26 to designate a range for which the expansion processing is not executed.

The expansion processing range 26 designated by the operator is registered in the expansion processing range information (see FIG. 7). When the expansion processing is executed, the mask image generation unit 357 can add a margin only to the inside of the expansion processing range 26 based on the expansion processing range information.

Example of Margin Setting Screen

Figure 13:
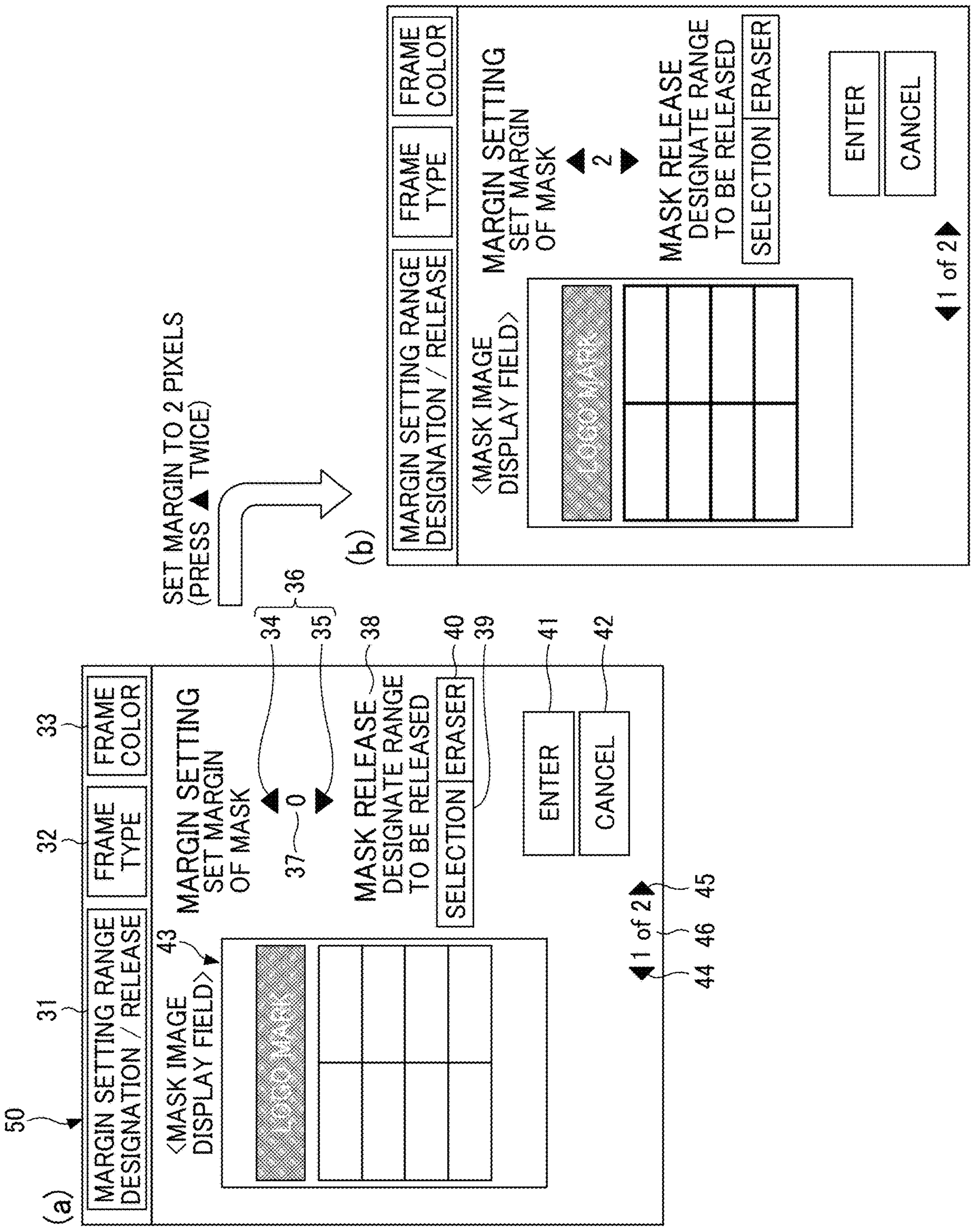
FIG. 13 is a diagram illustrating an example of a margin setting screen displayed on an operation panel, according to the embodiment of the present disclosure.

As illustrated in FIG. 13, the inspection apparatus 103 displays a margin setting screen 50. FIG. 13 is a diagram illustrating an example of the margin setting screen 50 displayed on the operation panel 133 or the operation panel 102, according to the embodiment of the present disclosure. Alternatively, the PC may display the margin setting screen 50.

The margin setting screen 50 includes a mask image display field 43, margin setting buttons 36 (an expansion button 34, a contraction button 35), mask releasing buttons 38 (a selection button 39, an eraser button 40), a set value 37, an enter button 41, and a cancel button 42. In the case where the contents on the front side and the back side are different on the pre-printed image 11, a page return button 44, a current page 46, and a page forward button 45 are presented.

The selection button 39 is a button that is pressed when the operator designates, with a mouse or a fingertip (through a touch panel), a range for which the operator desires to release masking. The eraser button 40 is a button for deleting the range designated by the operator using the selection button 39 as a range for which the masking is to be released.

The enter button 41 is a button for storing the margin setting (i.e., the mask image, the expansion processing range information, or the mask releasing range information) set on the margin setting screen 50 and closing the margin setting screen 50. The cancel button 42 is a button for closing the margin setting screen 50 without storing the margin setting.

In the mask image display field 43, the mask intermediate image is visually displayed. The mask intermediate image displayed in the mask image display field 43 eventually turns to be a mask image. The margin setting buttons 36 are buttons used by the operator for adjusting the degree (width of the margin) of the expansion processing or the contraction processing. The margin setting buttons 36 include the set value 37 that indicates a value currently set. The initial value of the set value 37 is zero, and zero indicates no margin. When the operator presses the expansion button 34, the set value 37 increases by one. The expansion button 34 is an example of a visual representation included in the margin setting screen 50. When the operator presses the contraction button 35, the set value 37 deceases by one. The contraction button 35 is an example of another visual representation included in the margin setting screen 50.

A negative value cannot be set as the set value 37. The set value 37 is managed individually for each range for which a margin is set. Accordingly, when the operator changes the range for which a margin is set, the set value 37 once becomes zero. The set value 37 up to the time when the operator changes the range for which a margin is set is stored in the storage unit 351.

The mask intermediate image in the mask image display field 43 is updated in real time each time the margin setting buttons 36 are pressed. In part (b) of FIG. 13, a case where the mask intermediate image when the set value is "2" is illustrated. The ruled lines in part (b) of FIG. 13 are thicker than those in part (a) of FIG. 13. If the operator presses the contraction button 35 to return the set value to "zero" for the mask intermediate image in part (b) of FIG. 13, the ruled lines become thinner and the mask intermediate image returns to that in part (a) of FIG. 13.

Figure 14:
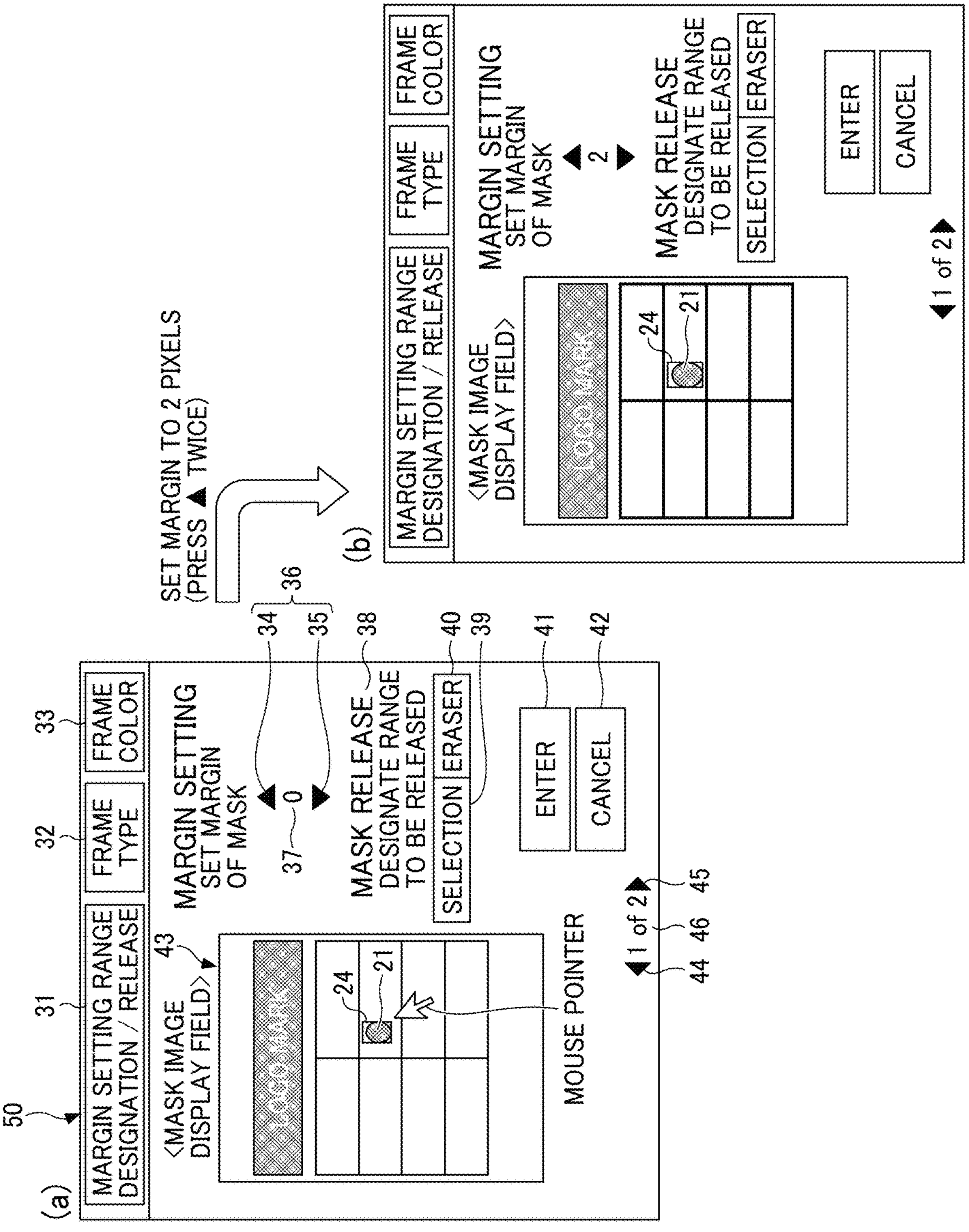
FIG. 14 is a diagram illustrating an example of a margin setting screen in a state where a mask releasing range is set, according to the embodiment of the present disclosure.

FIG. 14 is a diagram illustrating an example of the margin setting screen 50 in a state where a mask releasing range 24 is set, according to the embodiment of the present disclosure. The selection button 39 allows the operator to designate a range for which the operator desires to release the mask processing. In the case where a stain exists on the pre-printed sheet, the operator releases masking for the range where the stain exists.

When the operator presses the selection button 39, the operator can designate the mask releasing range 24 of a rectangular shape with the mouse or a fingertip. When the operator presses the eraser button 40 and then clicks or taps the mask releasing range 24, the frame indicating the mask releasing range 24 is erased. Thus, the operator can cancel the mask releasing range 24. The mask releasing range 24 set in this manner is stored in the mask releasing range information as illustrated in FIG. 8. A plurality of mask releasing ranges 24 can be set. The mask releasing range 24 is not limited to a rectangular shape, and the operator may select a circular shape or a triangular shape, or may freely draw a shape.

When the mask releasing range 24 is determined and the margin setting (the set value of the margin for each range for which a margin is set) is also determined, the operator presses the enter button 41. When the operator presses the cancel button 42, the set value of the margin returns to the default state. In addition, all the frames indicating the mask releasing ranges 24 are deleted.

The operator can increase the margin after designating the mask releasing range 24. In this case, since the stain 21 also expands, the user I/F unit 302 automatically expands the mask releasing range 24 by the amount of expansion. In part (b) of FIG. 14, a case where the mask releasing range 24 is expanded in accordance with the expansion of the stain 21 is illustrated. In this way, even when the portion of the stain expands in response to an increase of the set value 37 for the margin, the mask releasing range also expands. Thus, the masking for the portion of the stain can be easily released. On the other hand, when the operator decreases the set value of the margin from two to one, the portion of the stain is also contracted. Accordingly, the user I/F unit 302 automatically contracts the mask releasing range 24 by the amount of contraction. Based on a result of this process, the mask releasing range information of FIG. 8 is also updated.

The operator presses a frame type button 32 to select the type of frame line that indicates the mask releasing range 24. The type of frame line may be, for example, a solid line or a one-dot chain line. The operator presses a frame color button 33 to select the color of frame line that indicates the mask releasing range 24. The inspection apparatus 103 can change the display of the frame according to the preference of the operator or the visibility.

Figure 15:
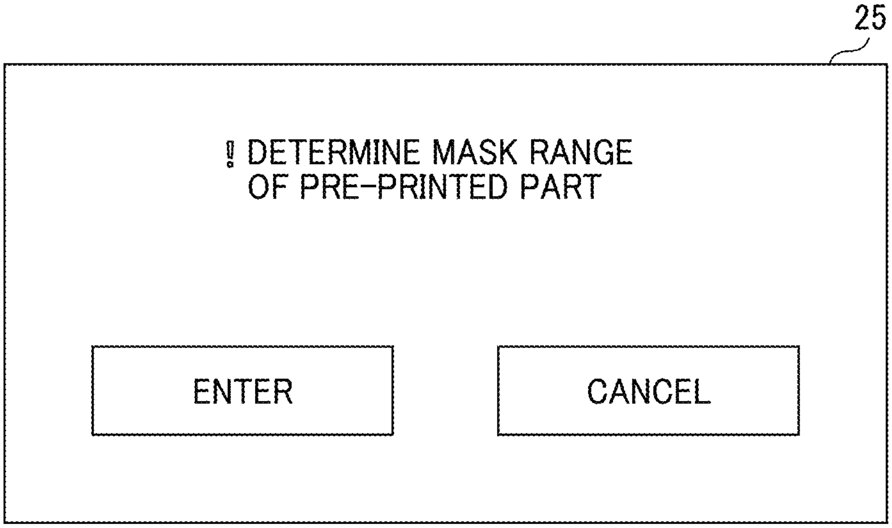
FIG. 15 is a diagram illustrating an example of a confirmation dialog box displayed when an enter button is pressed, according to the embodiment of the present disclosure.

FIG. 15 is a diagram illustrating an example of a confirmation dialog box 25 displayed when the enter button 41 is pressed, according to the embodiment of the present disclosure. In the case where the pre-printed sheet is single-sided, the confirmation dialog box 25 is displayed when the enter button 41 is pressed for the first page. In the case where the pre-printed sheet is double-sided, the confirmation dialog box 25 is displayed when the enter button 41 is pressed for both the first page and the second page.

When the operator presses the enter button 41, the mask image is stored in the storage unit 305, and the margin setting screen 50 is closed. The operator presses the cancel button 42 to continue the margin setting.

Figure 16:
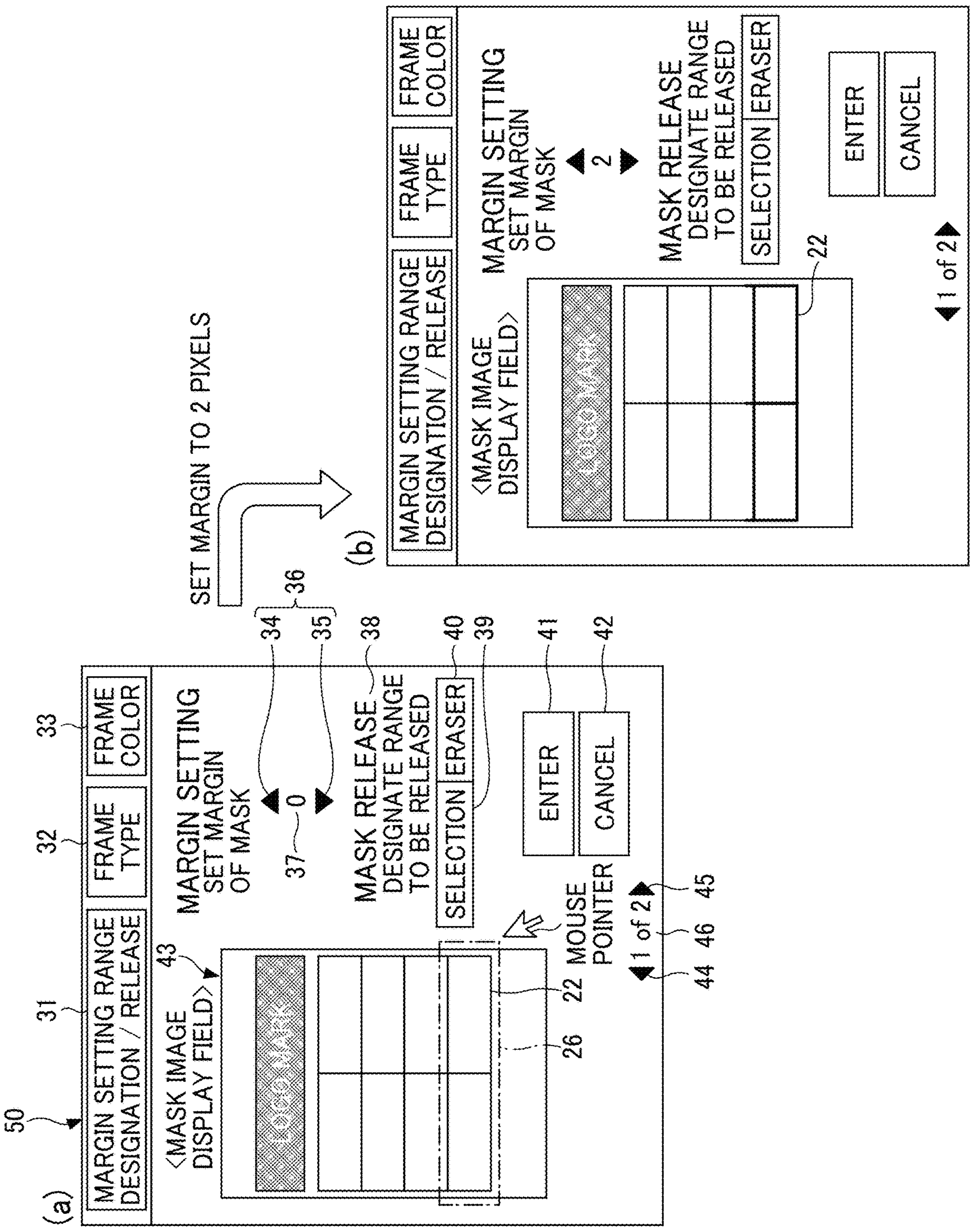
FIG. 16 is a diagram illustrating a setting method for setting a margin only for an expansion processing range, according to the embodiment of the present disclosure.

FIG. 16 is a diagram illustrating a setting method for setting a margin only for an expansion processing range, according to the embodiment of the present disclosure. As described with reference to FIG. 12, when the operator sets the margin only for the expansion processing range, the operator presses a button 31 for designating or releasing margin setting range ("margin setting button" 31). To release the margin setting for only the designated range, the operator presses the same margin setting button 31 again.

In a state where the operator presses the margin setting button 31, the margin setting screen 50 enters a state where a range can be designated. The operator can designate the expansion processing range 26 of a rectangular shape with the mouse or a fingertip. Since the expansion processing range 26 is determined by the coordinates of the rectangular range, the mask image generation unit 357 can execute the expansion processing only for the expansion processing range 26. The coordinates of the expansion processing range 26 are set in the expansion processing range information in FIG. 7.

When the margin setting range designation is selected, the margin setting using the margin setting buttons 36 is applied only to the expansion processing range 26. In part (a) of FIG. 16, the expansion processing range 26 is designated in the lower part of the mask intermediate image. When the margin is set using the margin setting buttons 36, the margin is set only for the lower part of the mask intermediate image as illustrated in part (b) of FIG. 16.

Note that, when the operator presses the margin setting button 31, a margin can be set for the entire face of the mask intermediate image.

The operation using the margin setting button 31 and the operation using the mask releasing buttons 38 (specifically, the selection button 39) are mutually exclusive. In other words, in the case of the margin setting range designation, when the operator presses the mask releasing buttons 38, the margin setting range designation is canceled. Conversely, in the case of setting the mask releasing range 24, when the operator presses the margin setting button 31, the setting for the mask releasing range 24 is released.

Figure 17:
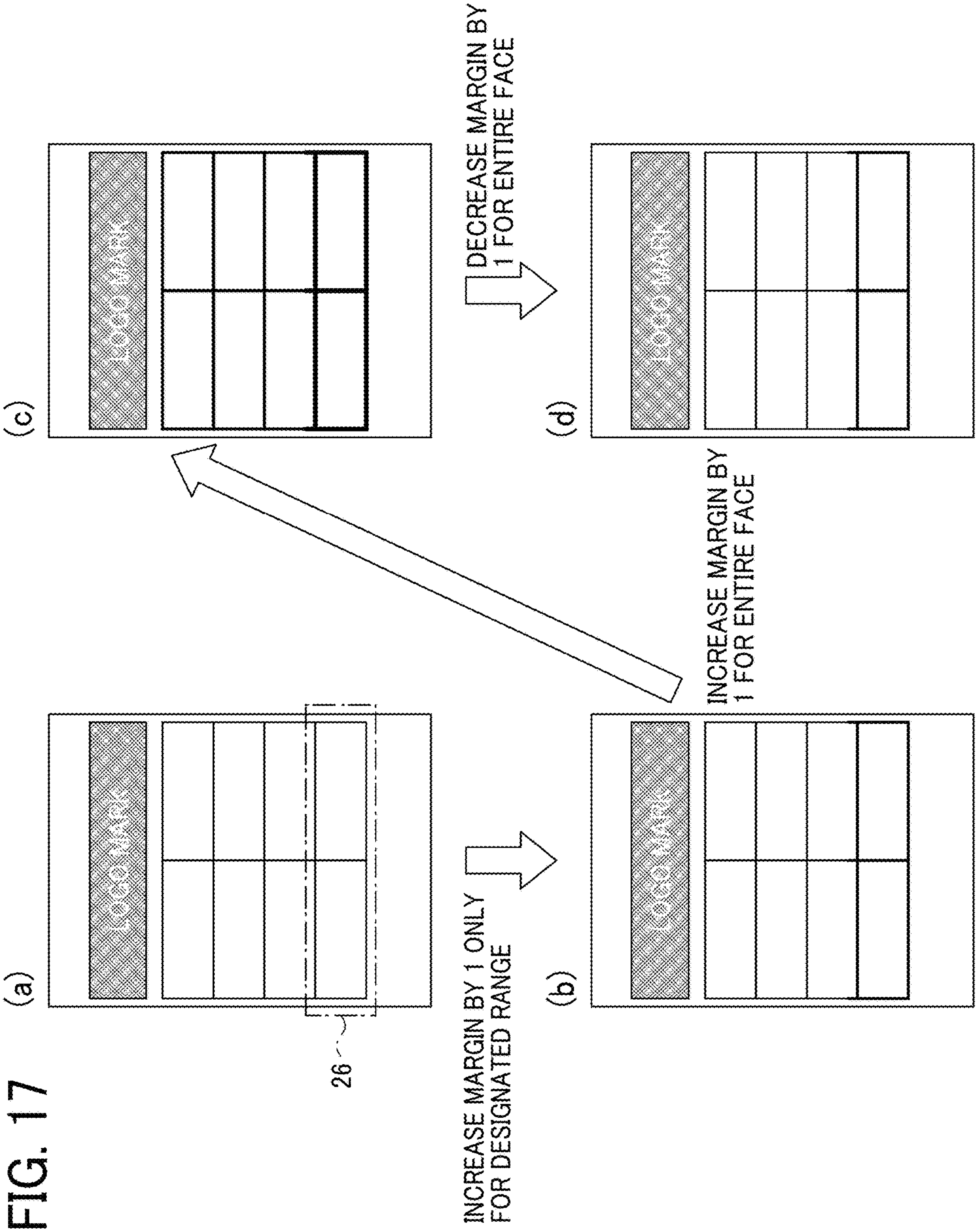
FIG. 17 is a diagram illustrating a method for setting a margin by switching between a partial margin setting and an entire face margin setting, according to the embodiment of the present disclosure.

FIG. 17 is a diagram illustrating a method for setting a margin by switching between a partial margin setting and an entire face margin setting, according to the embodiment of the present disclosure. In part (a) of FIG. 17, the expansion processing range 26 (an example of the first expansion processing range) is designated. In part (b) of in FIG. 17, as an example of the first expansion processing, a case where the operator presses the expansion button 34 to increase the margin only for the expansion processing range 26 is illustrated.

In part (c) of FIG. 17, as an example of the second expansion processing, a case where the operator cancels the margin setting for the expansion processing range 26, switches to setting a margin for the entire face (an example of the second expansion processing range), and increases the margin by one set value is illustrated. In this case, the margin for the entire face of the mask intermediate image including the expansion processing range 26 in part (b) of FIG. 17, for which the set value of the margin is already increased, is expanded by one set value. In this way, the operator can instruct the expansion processing to be executed partially on the mask intermediate image. Thus, the expansion processing can be executed separately for the range where a large margin is required and the range where a large margin is not required.

When the operator decreases the set value of the margin by one (presses the contraction button 35) while maintaining setting of a margin for the entire face, the margin for the entire face of the mask intermediate image is contracted by one set value as illustrated in part (d) of FIG. 17. Note that, in part (c) of FIG. 17, when the operator cancels the margin setting and switches to setting a margin for the entire face, the set value 37 of the margin setting buttons 36 turns to be "zero." Thereafter, the set value 37 turns to be "one" at the stage where the operations in part (c) of FIG. 17 are completed, and turns to be "zero" at the state of part (d) of FIG. 17. Accordingly, the operator cannot decrease the margin any more than in the state of part (d) of FIG. 17. In other words, the mask image generation unit 357 contracts the portion of the form not included in the expansion processing range 26 on the entire face up to the amount of expansion generated by the expansion processing executed for setting a margin for the entire face. In this way, the operator can manage the margin separately for the expansion processing range 26 and the entire face. In addition, the operator can avoid erroneously canceling the increase of the margin for the expansion processing range 26 when setting a margin for the entire face. In order to make the margin smaller than in the state illustrated in part (d) of FIG. 17, the operator may select the expansion processing range 26 again.

Processing Flow

The above-described process to set a margin is described in detail below.

Process of Mask Image Generation by Expansion Processing

Figure 18:
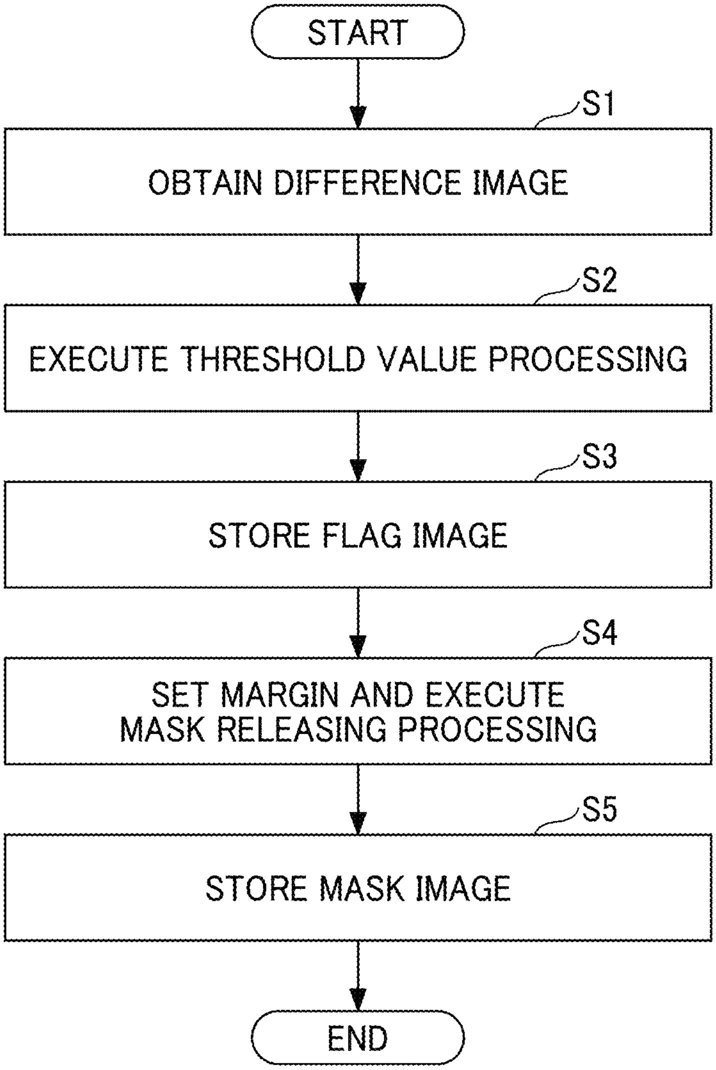
FIG. 18 is a flowchart of a process to generate a mask image by expansion processing, according to the embodiment of the present disclosure.

FIG. 18 is a flowchart of the process to generate a mask image by the expansion processing, according to the embodiment of the present disclosure.

S1: The printer conveys the pre-printed sheet from the sheet feeding tray to the inspection apparatus 103. The difference image generation unit 309 generates a difference image between the pre-printed image 11 generated by the printed image reading unit 307 of the inspection apparatus 103 reading the pre-printed sheet and the master image 12 whose entire face is white.

S2: The flag image generation unit 356 binarizes the difference image using the threshold value to generate a flag image 13. The threshold value may be fixed or may be designated by the operator.

S3: The flag image generation unit 356 stores the flag image 13 in the storage units 351 and 305. The flag image 13 stored in the storage unit 305 is used for a cancellation process to be described later (i.e., the original flag image 13 is kept for the cancellation process).

S4: The mask image generation unit 357 executes the process to set a margin for the flag image 13 stored in the storage unit 351. Although the mask releasing processing may or may not be executed, it is assumed that the mask releasing processing is executed in the present embodiment.

S5: The mask image generation unit 357 stores the mask image for which the process to set a margin has been executed in the storage unit 305.

Process of Mask Image Generation by OR Composition Processing

Figure 19:
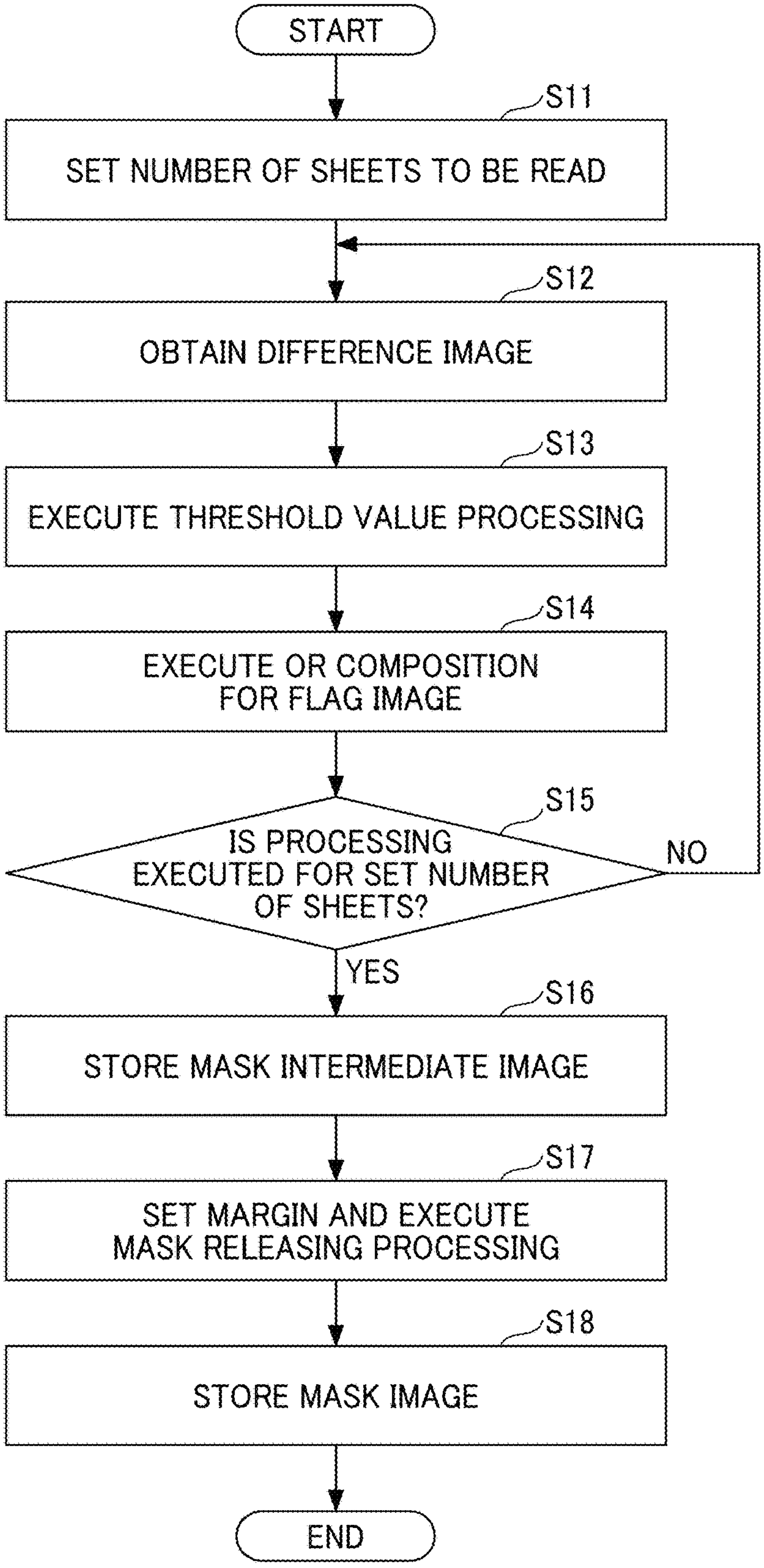
FIG. 19 is a flowchart of details of a process to generate a mask image by OR composition processing, according to the embodiment of the present disclosure.

FIG. 19 is a flowchart of details of the process to generate a mask image by the OR composition processing, according to the embodiment of the present disclosure.

S11: The operator sets the number of pre-printed sheets to be read. When the number of pre-printed sheets is one, the flag image 13 as illustrated in FIG. 9 is generated. When the number of pre-printed sheets is N, as illustrated in FIG. 10, the composite flag image 16 is generated by executing the OR composition processing for the deviation caused by each reading.

S12: The printer conveys the pre-printed sheet from the sheet feeding tray to the inspection apparatus 103. The difference image generation unit 309 generates a difference image between the pre-printed image 11 generated by the printed image reading unit 307 of the inspection apparatus 103 reading the pre-printed sheet and the master image 12 whose entire face is white.

S13: The flag image generation unit 356 binarizes the difference image using the threshold value to generate multiple flag images 13. The threshold value may be fixed or may be designated by the operator.

S14: The mask image generation unit 357 executes the OR composition processing for the multiple flag images 13 to generate a mask intermediate image.

S15: When the process has not been completed for the number of pre-printed sheets set to be read in S11 (NO in S15), the process proceeds to S12. When the process has been completed (YES in S15), the process proceeds to S16.

S16: The mask image generation unit 357 stores the mask intermediate image generated in S14 in the storage units 351 and 305.

S17: The mask image generation unit 357 executes the process to set a margin for the mask intermediate image stored in the storage unit 351 in S16. Although the mask releasing processing may or may not be executed, it is assumed that the mask releasing processing is executed in the present embodiment.

S18: The mask image generation unit 357 stores, in the storage unit 305, the mask image for which the process of S17 has been completed.

Details of Process of Step S4 or S17

Figure 20:
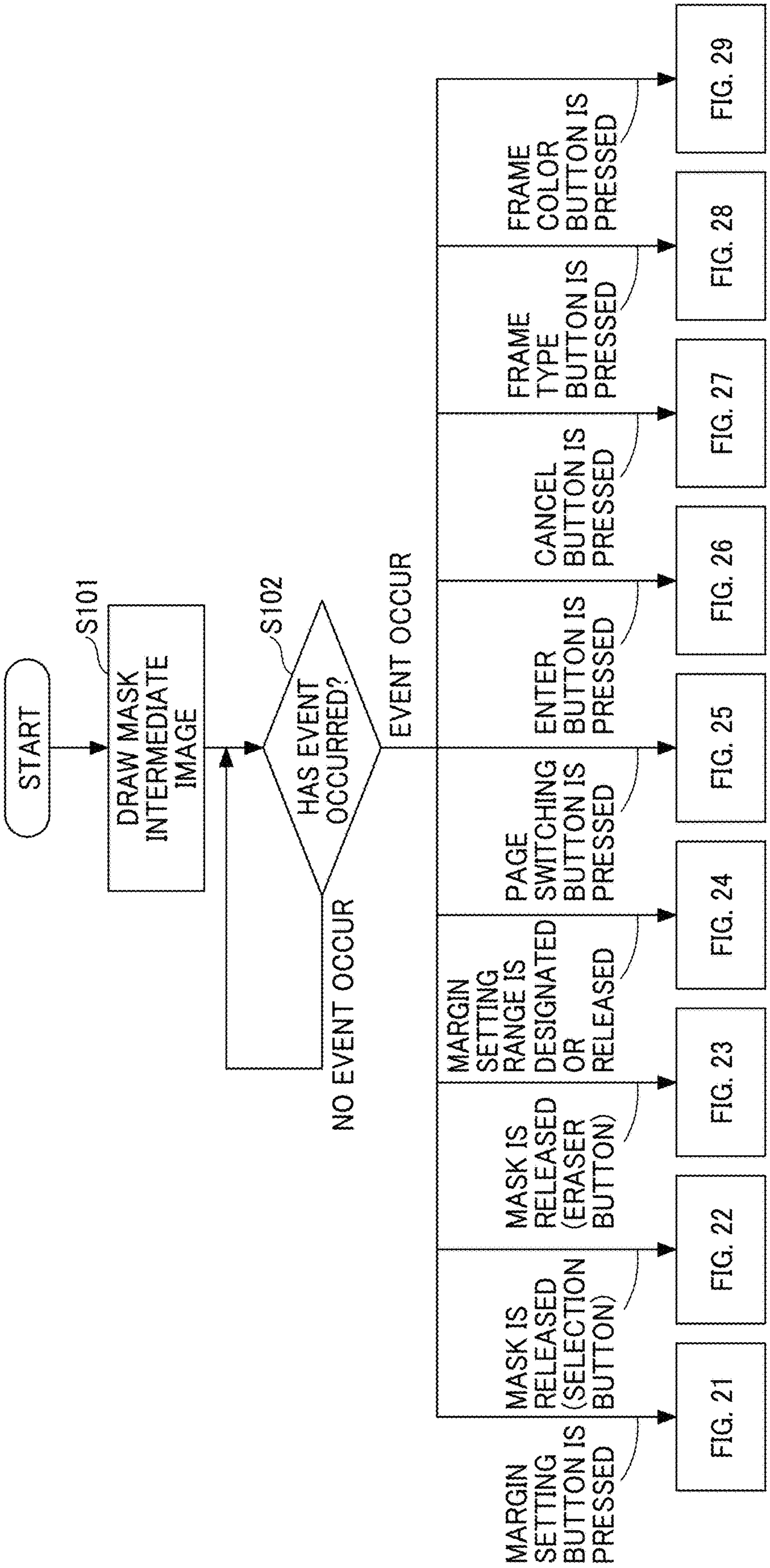
FIG. 20 is a flowchart of details of a process executed in step S4 or S7 according to the embodiment of the present disclosure.

FIG. 20 is a flowchart of details of the process executed in step S4 or S17 according to the embodiment of the present disclosure.

S101: On the margin setting screen 50 illustrated in, for example, FIG. 13, the user I/F unit 302 draws a mask intermediate image in the mask image display field 43.

S102: The inspection apparatus 103 waits for the following events. Although the margin setting button 31 may or may not be provided, it is assumed that the margin setting button 31 is provided in the present embodiment. When the margin setting range is not designated, the process to set a margin is executed for the entire image.

Figure 28:
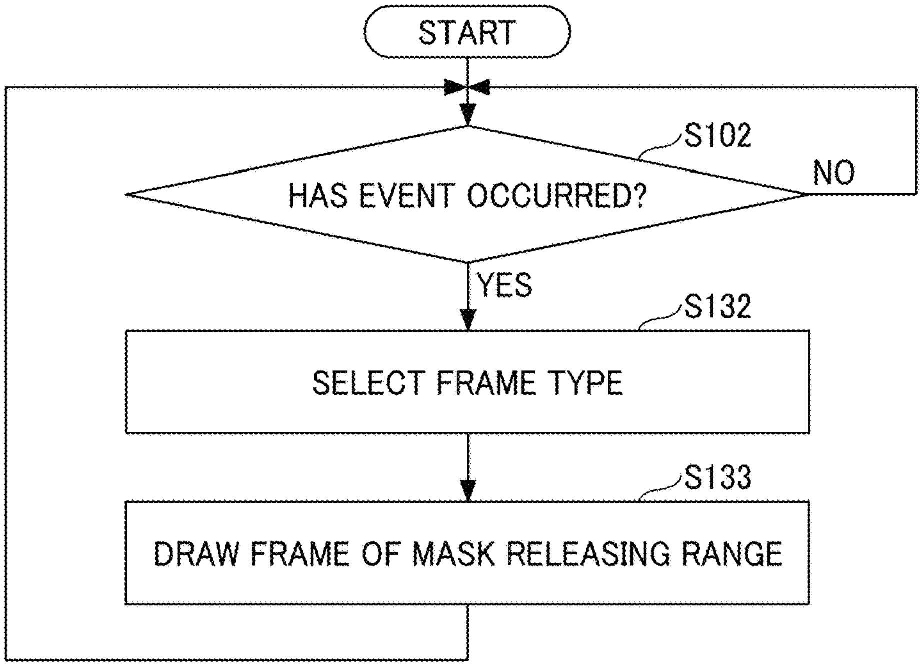
FIG. 28 is a flowchart of a process in which a user interface (I/F) unit changes the type of frame line according to the embodiment of the present disclosure.
Figure 29:
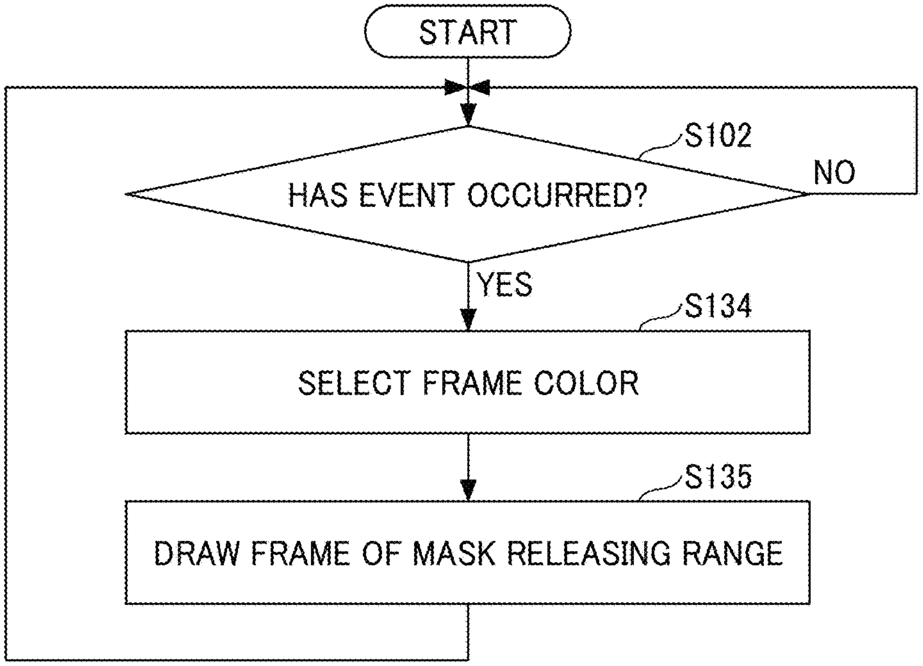
FIG. 29 is a flowchart of a process in which a user I/F unit changes the color of frame line according to the embodiment of the present disclosure.

1) One of the margin setting buttons 36 (the expansion button 34 or the contraction button 35) is pressed (refer to FIG. 21).
2) One of the mask releasing buttons 38 (specifically, the selection button 39) is pressed (refer to FIG. 22).
3) One of the mask releasing buttons 38 (specifically, the eraser button 40) is pressed (refer to FIG. 23).
4) The margin setting button 31 is pressed (refer to FIG. 24)
5) A page switching button (the page return button 44 or the page forward button 45) is pressed (refer to FIG. 25).
6) The enter button 41 is pressed (refer to FIG. 26).
7) The cancel button 42 is pressed (refer to FIG. 27).
8) The frame type button 32 is pressed (refer to FIG. 28).
9) The frame color button 33 is pressed (refer to FIG. 29).

Figure 21:
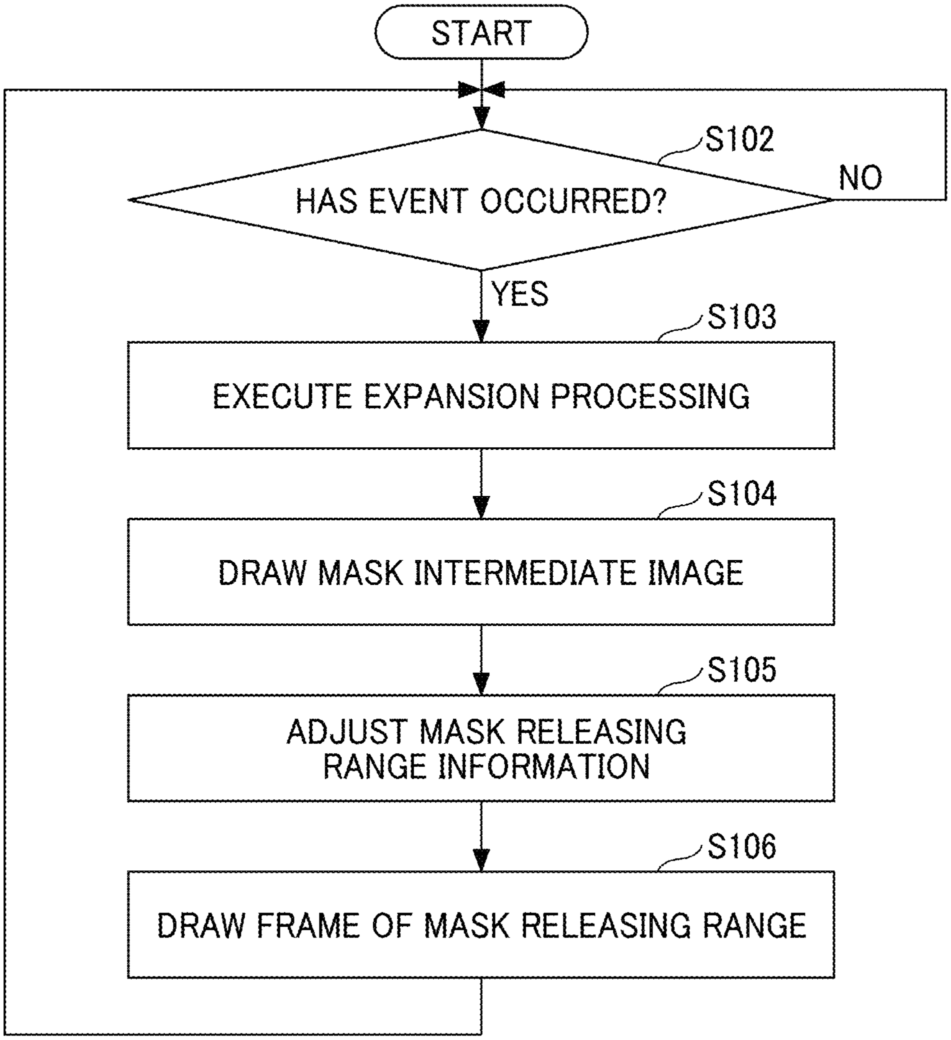
FIG. 21 is a flowchart of a process in which a mask image generation unit changes the expansion level in the case where a margin setting button (expansion button, contraction button) is pressed, according to the embodiment of the present disclosure.

FIG. 21 is a flowchart of the process in which the mask image generation unit 357 changes the expansion level in the case where one of the margin setting buttons 36 (the expansion button 34 or the contraction button 35) is pressed, according to the embodiment of the present disclosure.

S103: When one of the margin setting buttons 36 (the expansion button 34 or the contraction button 35) is pressed, the mask image generation unit 357 executes, based on the expansion processing range information of FIG. 7, the expansion processing for the range on the flag image 13 stored in the storage unit 351 in S3 of FIG. 18. It is assumed that the expansion processing range information is initialized to coordinates that surround the entire mask intermediate image. However, when a margin determination flag is turned on in S122 to be described later, the process returns to the state for waiting for events without being executed.

S104: The user I/F unit 302 updates the mask intermediate image in the mask image display field 43 with the mask intermediate image on which the expansion processing has been executed.

S105: In response to the pressing of the margin setting buttons 36, the mask image generation unit 357 adjusts the mask releasing range information for the number of existing pieces of mask releasing range information, and overwrites and stores the adjusted mask releasing range information in the storage unit 351. This is because the size of the mask releasing range 24 increases or decreases as the margin increases or decreases.

S106: The user I/F unit 302 draws a frame representing the mask releasing range 24 at the coordinates corresponding to the mask releasing range information in the mask intermediate image displayed in the mask image display field 43. Then, the process returns to the state for waiting for events.

Figure 22:
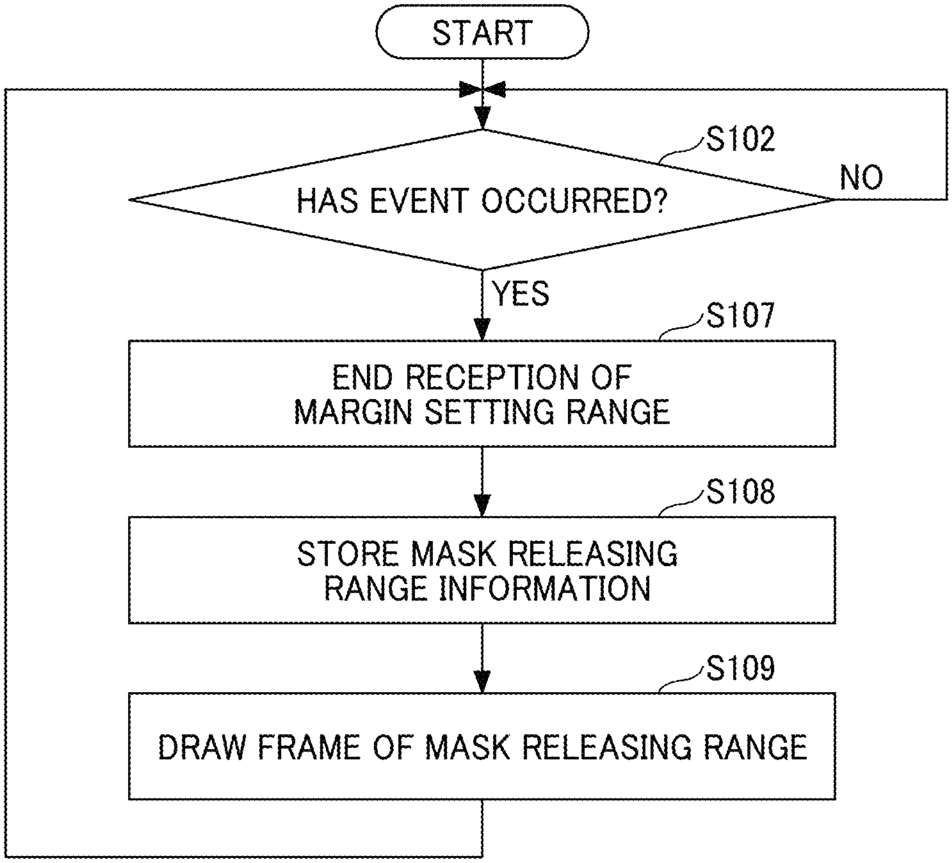
FIG. 22 is a flowchart of a process to set a mask releasing range according to the embodiment of the present disclosure.

FIG. 22 is a flowchart of the process to set the mask releasing range 24 according to the embodiment of the present disclosure.

S107: When the selection button 39 of the mask releasing buttons 38 is pressed, the user I/F unit 302 ends the reception of the margin setting range. Then, the operator can designate the mask releasing range 24 with the mouse. However, when a margin determination flag is turned on in S122, the process returns to the state for waiting for events without being executed.

Step 108: For example, the mask image generation unit 357 converts the coordinates of the upper left vertex and the lower right vertex of the range dragged by the operator while keeping a left-click into the coordinates of the mask intermediate image, sets the converted coordinates in the mask releasing range information of FIG. 8, and stores the mask releasing range information in the storage unit 351. The operator can designate a plurality of mask releasing ranges 24 by repeating a "drag while keeping a left-click."

S109: The user I/F unit 302 draws a frame representing the mask releasing range 24 at the coordinates corresponding to the mask releasing range information on the mask intermediate image displayed in the mask image display field 43. Then, the process returns to the state for waiting for events.

Figure 23:
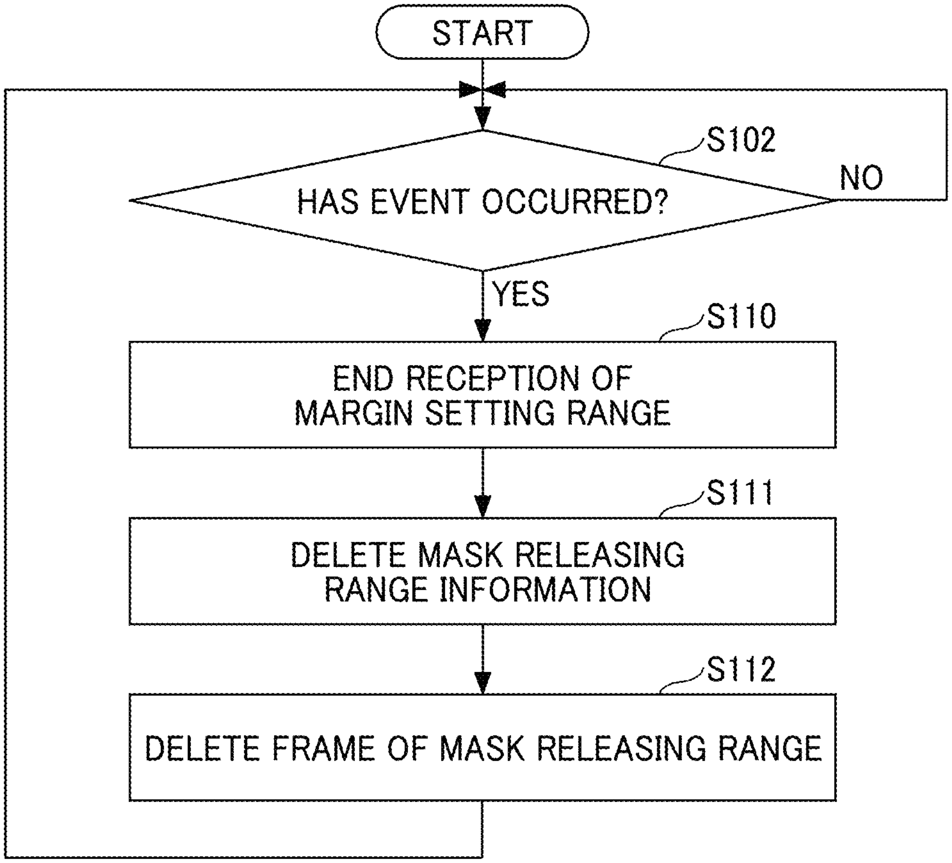
FIG. 23 is a flowchart of a process to delete a mask releasing range according to the embodiment of the present disclosure.

FIG. 23 is a flowchart of the process to delete the mask releasing range 24 according to the embodiment of the present disclosure.

S110: When the eraser button 40 of the mask releasing buttons 38 is pressed, the user I/F unit 302 ends the reception of the margin setting range. Then, the operator can designate the mask releasing range 24 with the mouse or a fingertip. However, when a margin determination flag is turned on in S122, the process returns to the state for waiting for events without being executed.

S111: The operator presses the frame or the inside of the frame of the mask releasing range 24 displayed in the mask image display field 43. The mask image generation unit 357 converts the coordinates of the mouse pointer at that time into the coordinates of the mask intermediate image, compares the coordinates with the coordinates of the mask releasing range 24 set in the mask releasing range information of FIG. 8, and deletes the corresponding information.

S112: The user I/F unit 302 redraws the frame of the mask releasing range 24 at the coordinates corresponding to the mask releasing range information on the mask intermediate image displayed in the mask image display field 43. As a result, the frame of the range previously designated disappears. The process then returns to the state for waiting for events.

Figure 24:
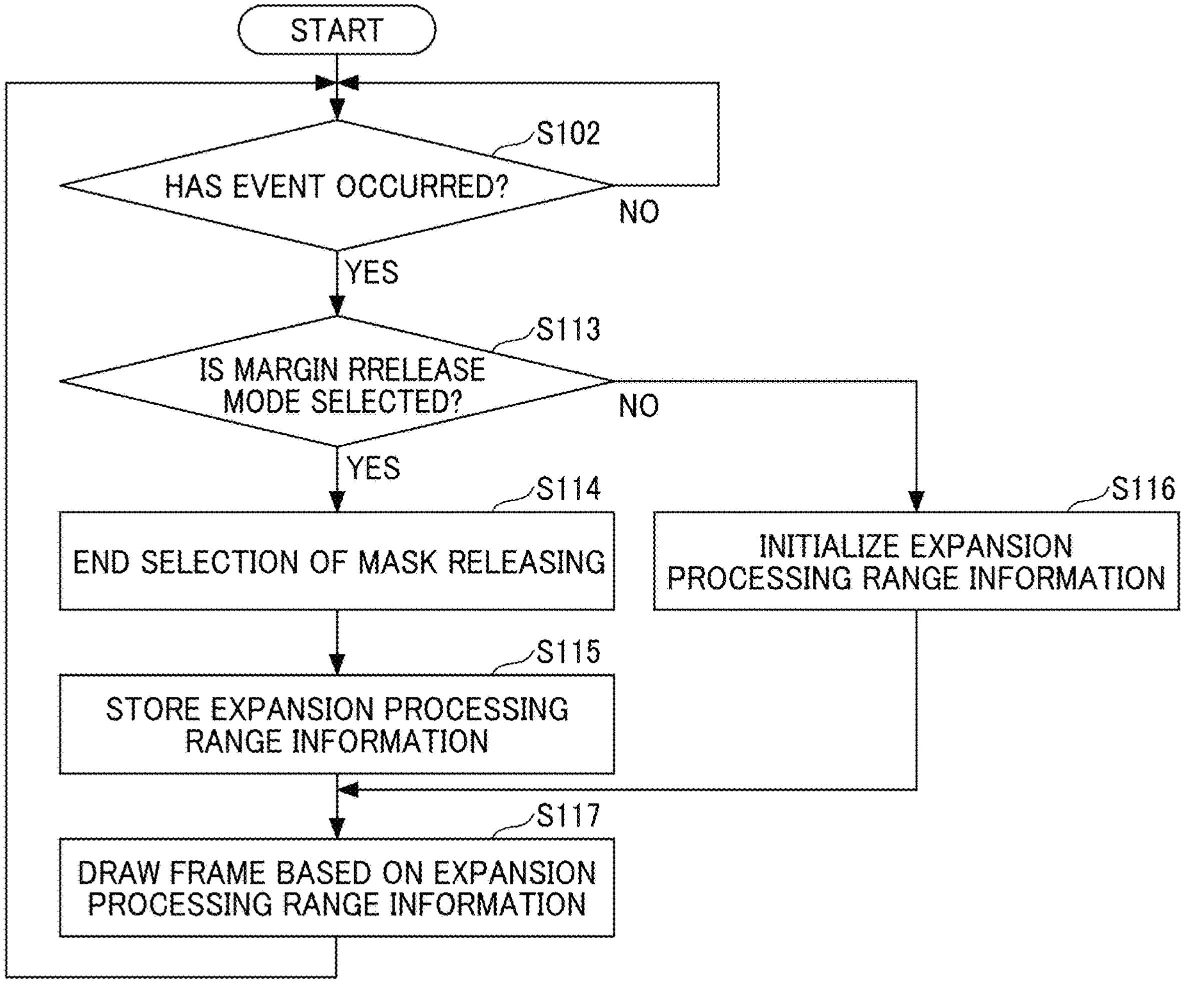
FIG. 24 is a flowchart of a process in the case where a margin setting range designation or release button is pressed according to the embodiment of the present disclosure.

FIG. 24 is a flowchart of the process in the case where the margin setting button 31 is pressed according to the embodiment of the present disclosure.

S113: When the margin setting button 31 is set to the margin setting range release mode before being pressed (that is, the margin setting range designation mode has been switched to the margin setting range release mode) (YES in S113), the process proceeds to S114. When the margin setting range release mode is not set (that is, the margin setting range release mode is switched to the margin setting range designation mode) (NO in S113), the process proceeds to S116. When the system is activated, the margin setting button 31 is set to the margin setting range release mode.

S114: The mask image generation unit 357 ends the reception of the selection of the mask releasing because of the exclusive control. Then, a rectangular range can be designated with the mouse or a fingertip for designating the margin setting range.

S115: For example, the mask image generation unit 357 converts the coordinates of the upper left vertex and the lower right vertex of the range dragged by the operator while keeping a left-click into the coordinates of the mask intermediate image, and stores the converted coordinates in the storage unit 351 as the expansion processing range information.

S116: The mask image generation unit 357 initializes the expansion processing range information of FIG. 7 to coordinates that surround the entire mask intermediate image and stores the coordinates in the storage unit 351.

S117: The user I/F unit 302 draws a frame representing the expansion processing range at the coordinates corresponding to the expansion processing range information on the mask intermediate image displayed in the mask image display field 43. Then, the process returns to the state for waiting for events.

Figure 25:
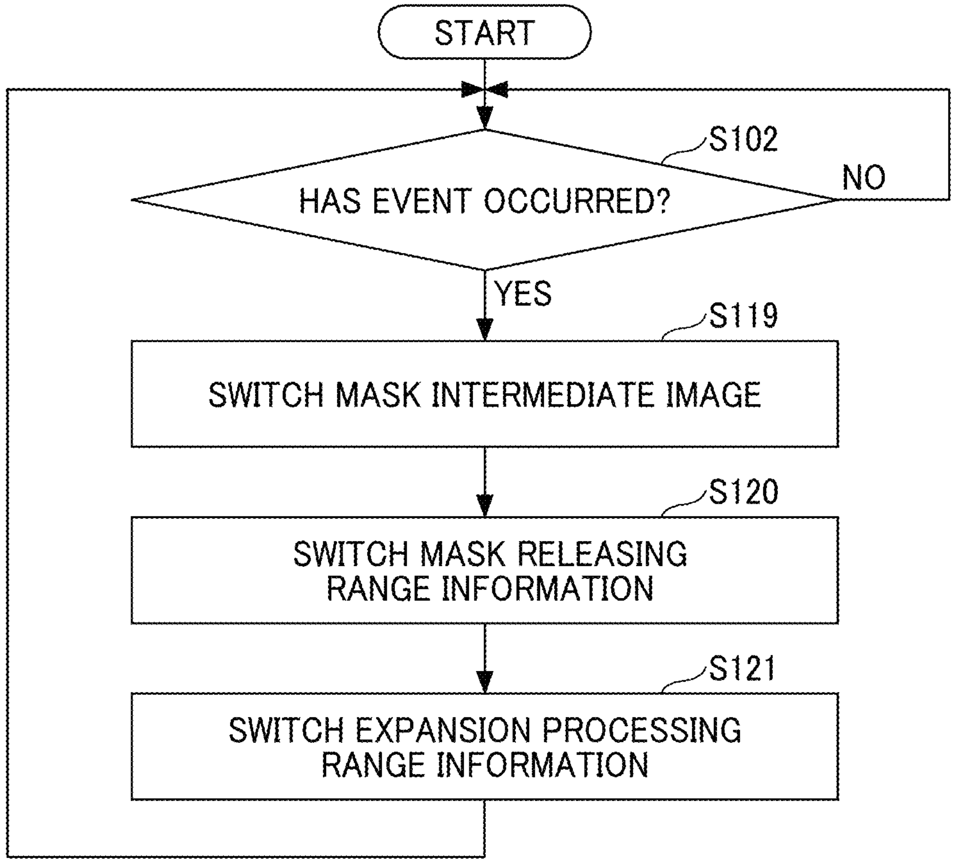
FIG. 25 is a flowchart of a process to switch a page according to the embodiment of the present disclosure.

FIG. 25 is a flowchart of the process to switch a page according to the embodiment of the present disclosure.

S119: When a page switching button (the page return button 44 or the page forward button 45) is pressed, the user I/F unit 302 stores a page currently being displayed in the storage unit 351, reads out either the front or back page of the mask intermediate image from the storage unit 351, and updates the mask intermediate image displayed in the mask image display field 43 with the read out mask intermediate image. Note that, in the case of single-sided printing, the page cannot be switched.

S120: The user I/F unit 302 executes substantially the same process for the mask releasing range information to draw a frame representing the mask releasing range 24.

S121: The user I/F unit 302 executes substantially the same process for the expansion processing range information to draw a frame representing the expansion processing range.

Figure 26:
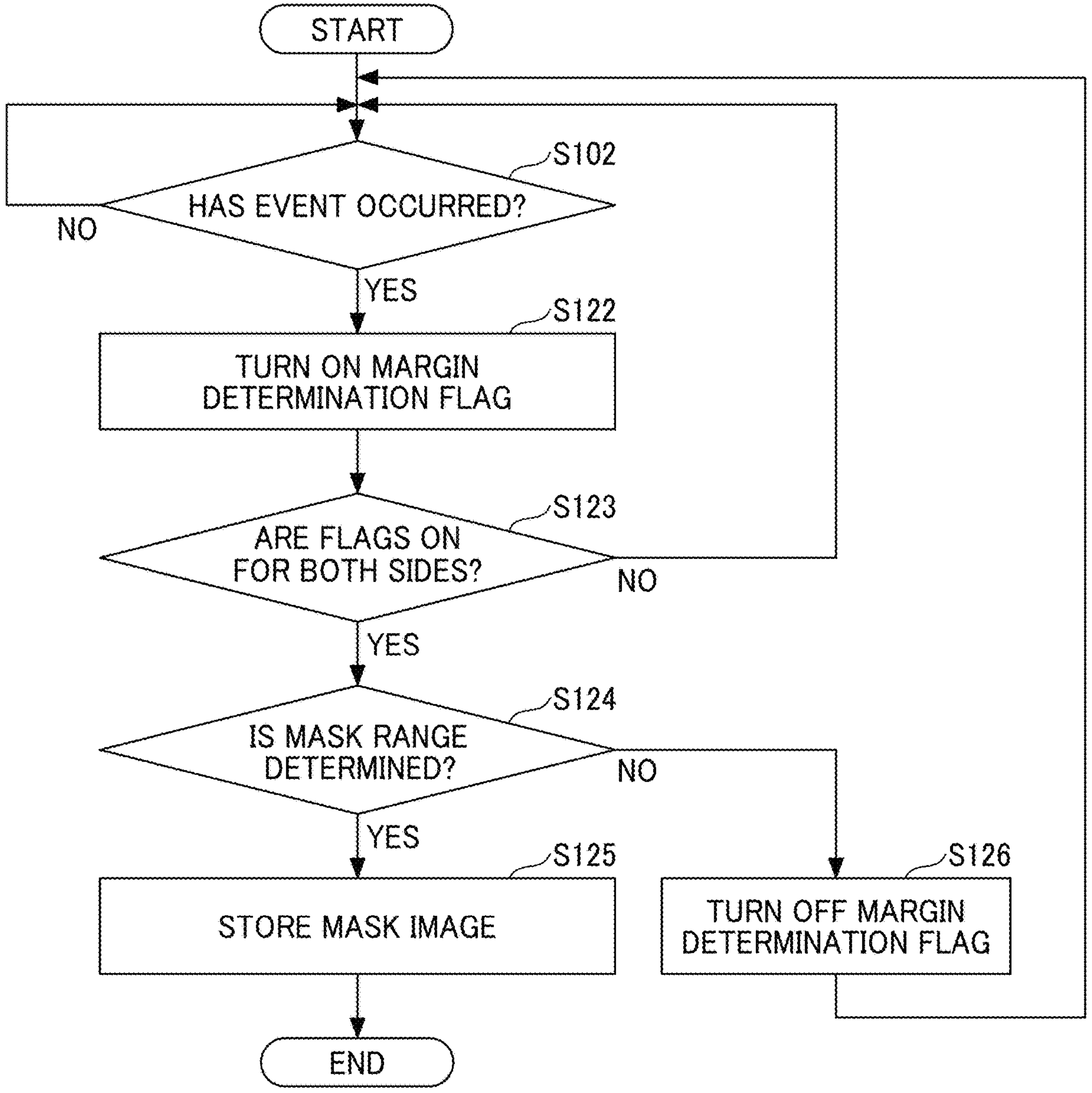
FIG. 26 is a flowchart of a process executed when a margin is determined according to the embodiment of the present disclosure.

FIG. 26 is a flowchart of the process executed when a margin is determined according to the embodiment of the present disclosure.

S122: When the enter button 41 is pressed on the margin setting screen 50, the user I/F unit 302 turns the margin determination flag on for the page being displayed to restrict the mask image generation unit 357 to set a margin (for the mask image), designate a mask releasing range, and designate a margin setting range on the page for which the margin determination flag is turned on. The margin determination flag is stored in the storage unit 351 for each side of both sides. In the case of single-sided printing, the margin determination flag for the back side is fixed to be turned on.

S123: When the margin determination flags are turned on for both sides (YES in S123), the process proceeds to S124. When not (NO in S123), the process returns to the state for waiting for events.

S124: The user I/F unit 302 displays the confirmation dialog box 25 illustrated in FIG. 15. When the enter button of FIG. 15 is pressed (YES in S124), the process proceeds to S125. When the cancel button is pressed (NO in S124), the process proceeds to S126.

S125: The mask image generation unit 357 stores the mask image in the storage unit 305, and ends the mask image generation processing.

S126: The mask image generation unit 357 turns the margin determination flag off. Then, the process returns to the state for waiting for events. In the case of single-sided printing, the margin determination flag for the back side remains to be turned on.

Figure 27:
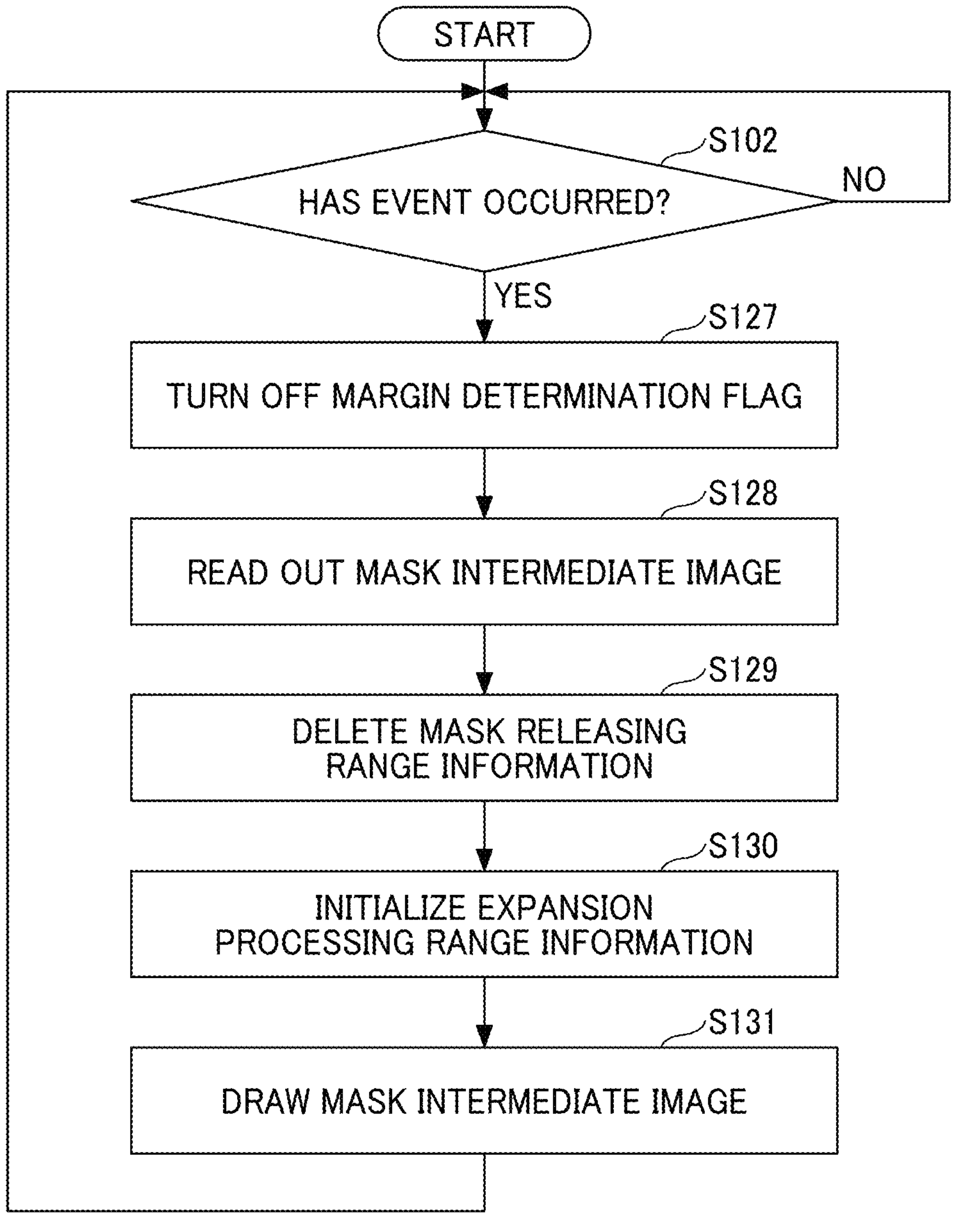
FIG. 27 is a flowchart of a process executed when a cancel button is pressed according to the embodiment of the present disclosure.

FIG. 27 is a flowchart of the process executed when the cancel button 42 is pressed according to the embodiment of the present disclosure.

S127: When the cancel button 42 is pressed on the margin setting screen 50, the user I/F unit 302 turns the margin determination flag off for the page being displayed.

S128: The user I/F unit 302 reads out the flag image 13 from the storage unit 305 and stores the flag image 13 in the storage unit 351. This flag image 13 is the one stored in S3 of FIG. 18 or S16 of FIG. 19.

S129: The mask image generation unit 357 deletes all the pieces of the mask releasing range information for the page being displayed.

S130: The mask image generation unit 357 initializes the expansion processing range information for the page being displayed.

S131: The user I/F unit 302 updates the mask intermediate image displayed in the mask image display field 43 with the flag image 13.

FIG. 28 is a flowchart of the process in which the user I/F unit 302 changes the type of frame line according to the embodiment of the present disclosure.

S132: When the frame type button 32 is pressed, the operator can change the type of frame line for the mask releasing range 24 or the expansion processing range 26. The operator can select the type of frame line from, for example, a solid line, a dotted line, and a one-dot chain line. The type of frame line may be set differently for the front side and the back side.

S133: The user I/F unit 302 redraws the frame with the selected line type. Then, the process returns to the state for waiting for events. When the color is changed in S134 to be described below, the frame is displayed in the changed color.

FIG. 29 is a flowchart of the process in which the user I/F unit 302 changes the color of frame line according to the embodiment of the present disclosure.

S134: When the frame color button 33 is pressed, the operator can change the color of frame line for the mask releasing range. The operator may select the color of frame line from, for example, black, red, and blue. The color of frame line may be set differently for the front side and the back side.

S135: The user I/F unit 302 redraws the frame in the selected color. Then, the process returns to the state for waiting for events. When the line type is changed in S132, the frame is displayed with the changed line type.

The printing system according to the present embodiment can set a margin for a portion of a form in a mask image. In this way, the portion of the form is expanded. Thus, even when distortion occurs due to the misalignment of the form on the pre-printed sheet or the skew of the pre-printed sheet, the portion of the form of the inspection image can be masked. As a result, the portion of the form is prevented from being erroneously detected as a defect.

APPLIED CASES

While some embodiments of the present disclosure have been described, the present disclosure is not limited to such embodiments and may be modified and substituted in various ways without departing from the spirit of the present disclosure.

For example, the margin setting screen 50 described with reference to, for example, FIG. 13 may be displayed by, for example, a PC, instead of the display provided with the inspection apparatus 103. In this case, the inspection apparatus 103 transmits the screen information of the margin setting screen 50 described in, for example, a hypertext markup language (HTML) to the PC as a web server. On the PC, a web browser is operating, and the margin setting screen 50 is displayed. Alternatively, on the PC, a native application may operate.

In the present embodiments, the inspection apparatus 103 generates the difference image 17 between the inspection image 64 and the master image 65, and then masks the difference image 17 using the mask image 15. However, the inspection apparatus 103 may mask the inspection image 64 using the mask image 15 and then create the difference image 17 using the master image 65.

Some or all of the functions illustrated in FIG. 4 may be included in a server apparatus. In this case, the inspection apparatus 103 communicates with the server apparatus, transmits the read image data to the server apparatus, and receives the inspection result from the server apparatus. The mask image is also generated by the server apparatus. The server apparatus displays the margin setting screen 50 on the PC as a web server.

The functional configuration according to the present embodiments illustrated in FIG. 4 is divided according to functions in order to facilitate understanding of the processing units executed by the inspection apparatus 103. No limitation to the scope of the present disclosure is intended by how the processing units are divided or by the names of the processing units. The processing units executed by the inspection apparatus 103 may be divided into a greater number of processing units in accordance with the contents of the processing units. In addition, a single processing unit can be divided to include a greater number of processing units.

The printer 101 is not limited to a printing device employing an electrophotographic method, but may be any printing device employing, for example, an inkjet printing system, a thermal transfer system, a letterpress method, a lithographic method, an intaglio method, or a stencil method.

The printing system 100 is not limited to the one used for commercial printing, and may be used in, for example, an office, a factory, an ordinary home, or a convenience store.

The processing of the inspection apparatus 103 described in the present embodiments may be executed by a server apparatus connected via a network. In this case, in the pre-printed mask generation mode, the inspection apparatus 103 transmits the margin setting and the pre-printed image to the server apparatus. The server apparatus generates a mask image. In the detection mode during actual printing, the inspection apparatus 103 transmits the inspection image and the print data to the server apparatus. The server apparatus generates a difference image, executes the mask processing on the mask image, and transmits the inspection result to the inspection apparatus 103.

Each of the functions of the embodiments described above may be implemented by one or more processing circuits or circuitry. The functionality of the elements disclosed herein may be implemented using circuitry or processing circuitry which includes general-purpose processors, special-purpose processors, integrated circuits, application-specific integrated circuits (ASICs), digital signal processors (DSPs), field-programmable gate arrays (FPGAs), conventional circuitry and/or combinations thereof which are configured or programmed to perform the disclosed functionality.

Aspects of the present disclosure are, for example, as follows.

Aspect 1

An inspection apparatus inspects a printed matter that is a printed medium on which a form is printed in advance and an image is printed based on print data.

The inspection apparatus includes:

- a printed image reading unit that reads the printed medium to generate first image data;
- a mask image generation unit that generates a mask image on which a portion of the form in the first image data is expanded;
- a difference image generation unit that generates a difference image between second image data generated by the printed image reading unit reading the printed matter and a master image generated from the print data;
- a mask processing unit that executes mask processing on the difference image using the mask image; and
- a defect determination processing unit that determines whether a defect exists on the printed matter based on the difference image on which the mask processing is executed.

Aspect 2

In the inspection apparatus according to Aspect 1, the mask image generation unit executes expansion processing on the portion of the form in the first image data to expand the portion of the form.

Aspect 3

In the inspection apparatus according to Aspect 1, the mask image generation unit composes a plurality of pieces of first image data generated by the printed image reading unit reading a plurality of print media to expand the portion of the form.

Aspect 4

The inspection apparatus according to Aspect 2 further includes a user interface (I/F) unit that displays a screen including an image presented based on the first image data and receives a designation of an expansion processing range for which the expansion processing is to be executed in the first image data, and the mask image generation unit executes the expansion processing only for the expansion processing range.

Aspect 5

In the inspection apparatus according to Aspect 4, the screen includes an expansion button for receiving an instruction to execute the expansion processing. The mask image generation unit repeatedly executes the expansion processing each time the expansion button is pressed. The user I/F unit updates the first image data each time the expansion processing is executed.

Aspect 6

In the inspection apparatus according to Aspect 5, the screen includes a contraction button for receiving an instruction to execute contraction processing for the portion of the form in the first image data. The mask image generation unit repeatedly executes the contraction processing each time the contraction button is pressed. The user I/F unit updates the first image data each time the contraction processing is executed.

Aspect 7

In the inspection apparatus according to Aspect 6, in a case that first expansion processing is executed for a first expansion processing range and a second expansion processing range including the first expansion processing range is designated, the mask image generation unit executes second expansion processing for a range where the first expansion processing range and the second expansion processing range overlap in addition to the first expansion processing and executes the second expansion processing for the portion of the form for which the first expansion processing is not executed in a range of the second expansion processing range, in which the first expansion processing range does not overlap.

Aspect 8

In the inspection apparatus according to Aspect 7, in a case that the second expansion processing is executed and the contraction button is pressed, the mask image generation unit contracts the portion of the form in the second expansion processing range up to an amount of expansion generated by the second expansion processing.

Aspect 9

In the inspection apparatus according to any one of Aspects 5 to 8, the user I/F unit receives a designation of a mask releasing range for releasing the mask processing on the screen including the image presented based on the first image data. The mask processing unit executes the mask processing on the difference image in a range excluding the mask releasing range using the mask image.

Aspect 10

In the inspection apparatus according to Aspect 9, the user I/F unit displays a frame representing the mask releasing range, and expands the frame in a case that the expansion button is pressed.

Aspect 11

In the inspection apparatus according to any one of Aspects 1 to 10, the portion of the form is one or more ruled lines forming a table.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The invention claimed is:

1. An inspection apparatus comprising:
- a reading device to read a printed medium on which a form is printed in advance to generate first image data, and a printed matter being the printed medium on which an image is printed by a printing apparatus based on print data to generate second image data; and
- circuitry configured to:
  - generate a difference image between the second image data and a master image, the master image being generated from the print data;
  - generate a mask image on which a portion of the form in the first image data is expanded;
  - execute mask processing on the difference image using the mask image; and
  - determine whether a defect exists on the printed matter based on the difference image on which the mask processing is executed,
  - wherein the portion of the form includes one or more ruled lines forming a table.

2. The inspection apparatus according to claim 1, wherein the circuitry is configured to execute expansion processing on the portion of the form in the first image data to expand the portion of the form.

3. The inspection apparatus according to claim 1, wherein
- the first image data includes a plurality of pieces of first image data generated based on data obtained by reading of a plurality of printed media, and
- the circuitry is further configured to compose a plurality of images generated from the plurality of pieces of first image data to expand the portion of the form.

4. The inspection apparatus according to claim 2, wherein the circuitry is further configured to:
- display, on a display, a screen including an image based on the first image data;
- receive a designation of an expansion processing range of the first image data to which the expansion processing is to be executed; and
- execute the expansion processing on the expansion processing range.

5. The inspection apparatus according to claim 4, wherein:
- the screen includes a visual representation for receiving an instruction to execute the expansion processing; and
- the circuitry is further configured to:
  - repeatedly execute the expansion processing each time the visual representation is pressed; and
  - update the first image data each time the expansion processing is executed.

6. The inspection apparatus according to claim 5, wherein:
- the screen includes another visual representation for receiving an instruction to execute contraction processing for the portion of the form in the first image data; and
- the circuitry is further configured to:
  - repeatedly execute the contraction processing each time said another visual representation is pressed; and
  - update the first image data each time the contraction processing is executed.

7. The inspection apparatus according to claim 6, wherein
- the expansion processing includes first expansion processing and second expansion processing,
- the expansion processing range includes a first expansion processing range that is a partial area of the expansion processing range, and a second expansion processing range that is an entire area of the expansion processing range,
- in a case that the second expansion processing range is designated after execution of the first expansion processing on the first expansion processing range,
- the circuitry is further configured to:
  - execute, in addition to the first expansion processing, the second expansion processing on a range of the second expansion processing range that overlaps with the first expansion processing range; and
  - execute the second expansion processing on the portion of the form in a range of the second expansion processing range other than the first expansion processing range.

8. The inspection apparatus according to claim 7, wherein, in a case that said another visual representation is pressed after execution of the second expansion processing,
- the circuitry is further configured to contract the portion of the form in the second expansion processing range up to an amount of expansion applied by the second expansion processing.

9. The inspection apparatus according to claim 5, wherein the circuitry is further configured to:
- receive a designation of a mask releasing range for cancelling the mask processing via the screen including the image based on the first image data; and
- execute the mask processing on the difference image in a range of the mask image excluding the mask releasing range using the mask image.

10. The inspection apparatus according to claim 9, wherein the circuitry is further configured to:
- display a frame representing the mask releasing range; and
- expand the frame in response to pressing of the visual representation.

11. An inspection method, comprising:
- obtaining first image data generated by reading a printed medium on which a form is printed in advance;
- obtaining second image data generated by reading a printed matter, the printed matter being the printed medium on which an image is printed by a printing apparatus based on print data;
- generating a difference image between the second image data and a master image, the master image being generated from the print data;
- generating a mask image on which a portion of the form in the first image data is expanded;
- executing mask processing on the difference image using the mask image; and determining whether a defect exists on the printed matter based on the difference image on which the mask processing is executed, wherein the portion of the form includes one or more ruled lines forming a table.

12. A non-transitory recording medium storing a plurality of program codes which, when executed by one or more processors, causes the processors to perform a method, the method comprising:

obtaining first image data generated by reading a printed medium on which a form is printed in advance;

obtaining second image data generated by reading a printed matter, the printed matter being the printed medium on which an image is printed by a printing apparatus based on print data;

generating a difference image between the second image data and a master image, the master image being generated from the print data;

generating a mask image on which a portion of the form in the first image data is expanded;

executing mask processing on the difference image using the mask image; and determining whether a defect exists on the printed matter based on the difference image on which the mask processing is executed, wherein the portion of the form includes one or more ruled lines forming a table.

* * * * *